(12) United States Patent
Kim et al.

(10) Patent No.: US 9,898,438 B2
(45) Date of Patent: Feb. 20, 2018

(54) SYMBOL LOCK METHOD AND A MEMORY SYSTEM USING THE SAME

(71) Applicant: SAMSUNG ELECTRONICS CO., LTD., Suwon-Si, Gyeonggi-Do (KR)

(72) Inventors: Hye-Ran Kim, Hwaseong-Si (KR); Tae-Young Oh, Seoul (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 67 days.

(21) Appl. No.: 14/879,618

(22) Filed: Oct. 9, 2015

(65) Prior Publication Data
US 2016/0103620 A1 Apr. 14, 2016

(30) Foreign Application Priority Data

Oct. 13, 2014 (KR) .................. 10-2014-0137866
Mar. 10, 2015 (KR) .................. 10-2015-0033247

(51) Int. Cl.
*G06F 3/06* (2006.01)
*G06F 13/42* (2006.01)

(52) U.S. Cl.
CPC .................. *G06F 13/4243* (2013.01)

(58) Field of Classification Search
CPC ...... G06F 13/4243; G06F 3/06; G06F 3/0611; G06F 3/0659; G06F 3/0673
USPC ........................................................ 711/105
See application file for complete search history.

(56) References Cited

U.S. PATENT DOCUMENTS

| | | | |
|---|---|---|---|
| 6,138,205 A | 10/2000 | Kawaguchi | |
| 6,202,119 B1 | 3/2001 | Manning | |
| 6,205,511 B1 | 3/2001 | Wen | |
| 7,042,799 B2 | 5/2006 | Cho | |
| 7,290,192 B2 | 10/2007 | Ichiyoshi | |
| 7,499,370 B2 | 3/2009 | Kim et al. | |
| 2006/0155816 A1* | 7/2006 | Umei | H04J 3/0647 709/208 |
| 2006/0171234 A1 | 8/2006 | Liu et al. | |
| 2008/0298159 A1* | 12/2008 | Kawabata | G11C 7/10 365/233.5 |
| 2014/0016404 A1 | 1/2014 | Kim et al. | |
| 2014/0056370 A1* | 2/2014 | Chang | H04L 25/14 375/259 |
| 2015/0012774 A1* | 1/2015 | Maeda | G06F 11/0724 714/5.1 |

FOREIGN PATENT DOCUMENTS

| | | |
|---|---|---|
| JP | 11-073778 | 3/1999 |
| JP | 2010-170164 | 8/2010 |
| KR | 1020120058980 | 6/2012 |
| KR | 1020140008745 | 1/2014 |

\* cited by examiner

*Primary Examiner* — Jasmine Song
(74) *Attorney, Agent, or Firm* — F. Chau & Associates, LLC

(57) ABSTRACT

A memory system includes a transmitter and a receiver. The transmitter is configured to transmit a data signal corresponding to a first symbol lock pattern and a data burst via an interface. The data burst includes a first data and a subsequent data. The receiver is configured to receive the data signal, to detect the first symbol lock pattern based on the received data signal, and to find the first data of the data burst according to the detected first symbol lock pattern.

19 Claims, 20 Drawing Sheets

SYMBOL LOCK METHOD AND A MEMORY SYSTEM USING THE SAME

CROSS-REFERENCE TO RELATED APPLICATIONS

This application claims priority under 35 U.S.C. § 119 to Korean Patent Application No. 10-2014-0137866, filed on Oct. 13, 2014, and Korean Patent Application No. 10-2015-0033247, filed on Mar. 10, 2015, in the Korean Intellectual Property Office, the disclosures of which are incorporated by reference herein in their entireties.

TECHNICAL FIELD

The present inventive concept relates to a semiconductor device, and more particularly, to a symbol lock method of finding a start point of a data burst and a memory system using the symbol lock method.

DISCUSSION OF THE RELATED ART

Semiconductor memory devices may be used to store data or operation commands of systems such as computers. In particular, when a semiconductor memory device such as dynamic random access memory (DRAM) is used in mobile systems, the memory device may be connected to peripheral systems through various interfaces, and may transmit and receive data that is processed by the systems. Thus, as an interfacing speed of the memory device is increased, demands for a high-speed symbol lock method in finding a starting point of the transmitted data may be increased.

SUMMARY

According to an exemplary embodiment of the present inventive concept, a memory system is provided. The memory system includes a transmitter and a receiver. The transmitter is configured to transmit a data signal corresponding to a first symbol lock pattern and a data burst via an interface. The data burst includes a first data and a subsequent data. The receiver is configured to receive the data signal, to detect the first symbol lock pattern based on the received data signal, and to find the first data of the data burst according to the detected first symbol lock pattern.

The receiver may store a plurality of second symbol lock patterns, compare each of the stored second symbol lock patterns with the received data signal, determine the received data signal to be matched with at least one of the stored second symbol lock patterns, and detect the first symbol lock pattern.

The transmitter may include a memory controller configured to output a write command. The receiver may include a memory device configured to a write enable signal in response to the write command, and find the first data of the data burst based on the write enable signal.

The memory device may include a clock generator, a sampler and write first-in first out (FIFO), and a symbol lock pattern detector. The clock generator may be configured to a clock signal, generate a first clock signal in synchronization with one of a rising edge or a falling edge of the clock signal, and generate a second clock signal in synchronization with another one of the rising edge or the falling edge of the clock signal. The sampler and write FIFO may be configured to receive and output the data signal and the data burst in response to the first and second clock signals and the write enable signal. The symbol lock pattern detector may be configured to detect the first symbol lock pattern based on an output of the sampler and write FIFO in response to the write enable signal, and to generate a data latch signal according to the detected first symbol lock pattern. The data aligner may be configured to output the data burst in parallel in response to the data latch signal.

The receiver may store a plurality of second symbol lock patterns, compare each of the stored second symbol lock patterns with the received data signal, determine the received data signal to be matched with at least one of the stored second symbol lock patterns, detect the first symbol lock pattern, generate a write enable signal according to the detected first symbol lock pattern, and find the first data of the data burst based on the write enable signal.

The memory device may include a clock generator, a sampler and write FIFO, a symbol lock pattern detector, and a data aligner. The clock generator may be configured to receive a clock signal, generate a first clock signal in synchronization with one of a rising edge or a falling edge of the clock signal, and generate a second clock signal in synchronization with another one of the rising edge or the falling edge of the clock signal. The sampler and write FIFO may be configured to receive and output the data signal and the data burst in response to the first and second clock signals. The symbol lock pattern detector may be configured to detect the first symbol lock pattern based on an output of the sampler and write FIFO, to generate the write enable signal based on the detected first symbol lock pattern, and to generate a data latch signal based on the write enable signal. The data aligner may be configured to output the data burst in parallel in response to the data latch signal.

Transmitter may include a memory device. The memory device may be configured to read data and transmit the read data as the data burst in response to a read command. The receiver may include a memory controller. The memory controller may be configured to output the read command and find the first data of the read data.

The memory controller may store a plurality of second symbol lock patterns, and detect the first symbol lock pattern by comparing each of the stored second symbol lock patterns with the received data signal.

The data signal corresponding to the first symbol lock pattern may be generated using a bit pattern transferred through some of a plurality of data lines disposed between the transmitter and the receiver.

The data signal corresponding to the first symbol lock pattern may be generated using a first voltage level applied to a first data line of a plurality of data lines disposed between the transmitter and the receiver.

The receiver may store a plurality of second symbol lock patterns, convert the first voltage level into a digital signal, and detect the first symbol lock pattern by comparing the converted digital signal with each of the stored second symbol lock patterns.

According to an exemplary embodiment of the present inventive concept, a memory device is provided. The memory device may include a command decoder, a sampler and write FIFO, and a symbol lock pattern detector. The command decoder may be configured to generate a write enable signal in response to a write command. The sampler and write FIFO may be configured to receive and output a write data burst and a data signal corresponding to a first symbol lock pattern according to a clock signal. The write data burst includes a first data and a subsequent data. The symbol lock pattern detector may be configured to find the first data of the write data burst based on the write enable signal.

The memory device may further include a clock generator configured to receive the clock signal, generate a first clock signal in synchronization with one of a rising edge or a falling edge of the clock signal, and generate a second clock signal in synchronization with another one of the rising edge or the falling edge of the clock signal. The sampler and write FIFO may serially output the write data burst and the data signal according to the first and second clock signals.

The symbol lock pattern detector may store a plurality of second symbol lock patterns, detect the first symbol lock pattern by comparing the data signal output from the sampler and write FIFO with each of the second symbol lock patterns in response to the write enable signal, and generate a data latch signal according to the detected first symbol lock pattern.

The memory device may further include a data aligner. The data aligner may be configured to output the write data burst in parallel in response to the data latch signal.

The memory device may include a three-dimensional (3D) memory array.

The 3D memory array may be monolithically formed at one or more physical levels of memory cells. Each of the memory cells may have an active region disposed on a silicon substrate.

The 3D memory array may include a plurality of memory cells. Each of the memory cells includes a charge trap layer.

Word lines or bit lines included in the 3D memory array may be shared between physical levels.

According to an exemplary embodiment of the present inventive concept, a memory device is provided. The memory device may include a sampler and write FIFO and a symbol lock pattern detector. The sampler and write FIFO is configured to receive and to output a data signal corresponding to a first symbol lock pattern and a write data burst according to a clock signal. The write data burst includes a first data and a subsequent data. The symbol lock pattern detector is configured to store a plurality of second symbol lock patterns, to detect the first symbol lock pattern by comparing an output of the sampler and write FIFO with each of the second symbol lock patterns, to generate a write enable signal according to the detected first symbol lock pattern, and to find the first data of the write data burst according to the write enable signal.

The memory device may further include a clock generator configured to receive the clock signal, generate a first clock signal in synchronization with one of a rising edge or a falling edge of the clock signal, and generate a second clock signal in synchronization with another one of the rising edge or the falling edge of the clock signal. The sampler and write FIFO may serially output the write data burst and the data signal according to the first and second clock signals.

The symbol lock pattern detector may generate a data latch signal based on the write enable signal.

The memory device may further include a data aligner configured to output the write data burst in parallel in response to the data latch signal.

According to an exemplary embodiment of the present inventive concept, a memory device is provided. The memory device includes a sampler and write first-in first out (FIFO) and a symbol lock pattern detector. The sampler and write FIFO is configured to receive and output a write data burst and a first voltage level corresponding to a first symbol lock pattern. The write data burst includes a first data and a subsequent data. The symbol lock pattern detector is configured to store a plurality of second symbol lock patterns, to convert the first voltage level into a digital signal, and to detect the first symbol lock pattern by comparing the digital signal with each of the second symbol lock patterns, and to find the first data of the write data burst according to the detected first symbol lock pattern.

The symbol lock pattern detector may further include an analog/digital converter configured to convert the first voltage level into the digital signal.

According to an exemplary embodiment of the present inventive concept, a method of performing a symbol lock operation is provided. The method includes transmitting, by a transmitter, a data signal corresponding to a first symbol lock pattern and a data burst having a first data and a subsequent data, storing, by a receiver, a plurality of second symbol lock patterns, comparing, by the receiver, the transmitted data signal with each of the second symbol lock patterns, determining, by the receiver, the transmitted data signal to be matched with at least one of the second symbol lock pattern, detecting the first symbol lock pattern, and finding, by the receiver, first data of the data burst according to the detected first symbol lock pattern.

The transmitting a data signal corresponding to a first symbol lock pattern may include generating the data signal using a bit pattern transferred through some of a plurality of data lines disposed between the transmitter and the receiver.

The transmitting a data signal corresponding to a first symbol lock pattern may include generating the data signal using a first voltage level applied to a first data line of a plurality of data lines disposed between the transmitter and the receiver.

The receiver may convert the first voltage level into a digital signal, and detect the first symbol lock pattern by comparing the digital signal with each of the second symbol lock patterns.

According to an exemplary embodiment of the present inventive concept, a memory system is provided. The memory system includes a memory controller and a memory device. The memory controller is configured to transmit a write command, a data signal corresponding to a first symbol lock pattern, and a data burst having a first data and a subsequent data. The memory device is configured to receive the write command, the data signal, and the data burst, to generate a write enable signal in response to the write command, to detect the first symbol lock pattern in response to the write enable signal, and to find the first data of the data burst based on the detected first symbol lock pattern.

The memory device may include a clock generator, a sampler and write FIFO, and a symbol lock pattern detector. The clock generator may be configured to receive a clock signal, generate a first clock signal in synchronization with one of a rising edge or a falling edge of the clock signal, and generate a second clock signal in synchronization with another one of the rising edge or the falling edge of the clock signal. The sampler and write FIFO may be configured to receive and output the data signal and the data burst in response to the first and second clock signals and the write enable signal. The symbol lock pattern detector may be configured to detect the first symbol lock pattern based on an output of the sampler and write FIFO in response to the write enable signal.

The memory device may include a storage unit and a comparator. The storage unit may store a plurality of second symbol lock patterns. The comparator may compare the received data signal with each of the second symbol lock patterns stored in the storage unit, determine the data signal to be matched with at least one of the second symbol lock patterns, and detect the first symbol lock pattern.

The symbol lock pattern detector may generate a data latch signal based on the detected first symbol lock pattern.

The memory device includes a data aligner outputting the data burst in parallel in response to the data latch signal.

BRIEF DESCRIPTION OF THE DRAWINGS

Exemplary embodiments of the present inventive concept will be more clearly understood from the following detailed description taken in conjunction with the accompanying drawings in which.

DETAILED DESCRIPTION OF THE EMBODIMENTS

Figure 1:
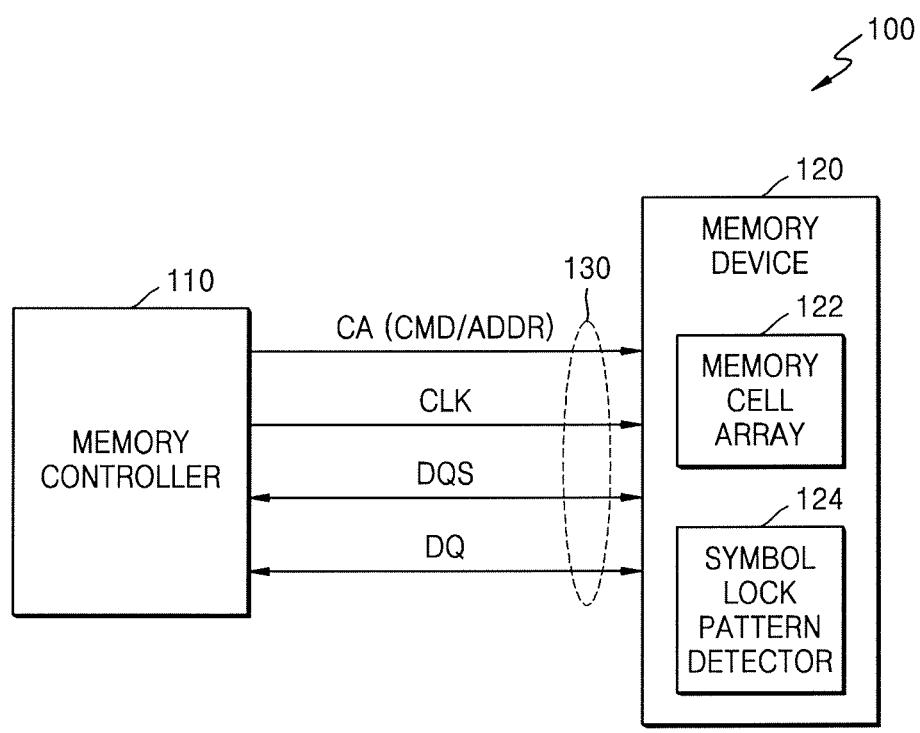
FIG. 1 is a block diagram illustrating a memory system including a memory device that performs a symbol lock method, according to an exemplary embodiment of the present inventive concept.

The present inventive concept will now be described more fully with reference to the accompanying drawings, in which exemplary embodiments of the present inventive concept are shown. The present inventive concept may, however, be embodied in many different forms and should not be construed as being limited to the exemplary embodiments set forth herein. Like reference numerals may denote like elements throughout the specification and drawings. Thus, the present inventive concept is not limited to the illustrated relative sizes or intervals of the attached drawings. As used herein, the term "and/or" includes any and all combinations of one or more of the associated listed.

As used herein, the singular forms "a", "an" and "the" are intended to include the plural forms as well, unless the context clearly indicates otherwise.

A memory device, e.g., dynamic random access memory (DRAM), receives a data burst as a data input/output (DQ) signal after a write latency (WL) from reception of a write command, recognizes the received data burst as a symbol, and performs a write operation. The symbol may be understood to mean a write data burst. To ensure the write operation, the memory device may recognize DQ data as the beginning of the symbol. The DQ data may be received at the time tDQSS after the write latency WL. The time tDQSS is defined as a delay time until a first rising edge of a data strobe (DQS) signal after the write latency WL. The symbol includes a plurality of data bits, and one data bit period may be referred to as a unit interval (UI).

The operation of the memory device is controlled by a memory controller. In an input/output (I/O) interface between the memory controller and the memory device, the memory device may perform a symbol lock operation by using the time tDQSS to find a first UI (e.g., a start point) from the symbol of the write data burst which is provided from the memory controller.

In the memory device (e.g., DRAM), as the speed of the I/O interface increases, skew may occur in a clock signal associated with the command or the data. Therefore, in the memory device having a high-speed interface, performance of a symbol lock method using the time tDQSS may be decreased since the time tDQSS is correlated with the clock signal.

In an exemplary embodiment of the present inventive concept, a memory device (e.g., DRAM) is provided. The memory device performs a symbol lock method without regard to a clock signal. The symbol lock method detects a symbol lock pattern which is prearranged between a memory controller and the memory device, and finds first data (e.g., a start point) of a data burst according to the detected symbol lock pattern.

FIG. 1 is a block diagram illustrating a memory system 100 including a memory device 120 that performs a symbol lock method according to an exemplary embodiment of the present inventive concept.

Referring to FIG. 1, the memory system 100 may include a memory controller 110 and the memory device 120. The memory system 100 may allocate program codes to the memory device 120 to make a processor to execute an application program. The program codes include a set of commands and data. The memory controller 110 may be embedded in the processor. In an exemplary embodiment, the memory controller 110 may be implemented as a chip separate from the processor, and may be connected to the processor. The memory controller 110 may support read and/or write memory transactions to access the memory device 120.

According to an exemplary embodiment, the memory controller 110 may execute the memory transactions of other chipset constituting the system 100 other than the processor. For example, in a case where the system 100 is a computing device, a chipset may be implemented with at least one integrated circuit (IC) package or a chip that connects components of the computing device to the processor. For example, a component of the computing device may include basic input/output system (BIOS) firmware, a keyboard, a mouse, a storage device, a network interface, and a power management integrated circuit (PMIC).

The memory controller 110 may be connected to the memory device 120 through buses 130. The memory controller 110 may output a command CMD, an address ADDR, a clock signal CLK, a data strobe signal DQS, and data DQ to the memory device 120 through the buses 130. Among the buses 130, a command bus and an address bus may be implemented with a single line CA. The command CMD and the address ADDR may be transmitted through the line CA in time series. The data DQ may be output from the memory device 120 in response to the command CMD of the memory controller 110 and may be transmitted to the memory controller 110 through the buses 130.

In an exemplary embodiment, the buses 130 may include lines configured to transmit control signals, such as a clock enable signal CKE, a row address strobe signal /RAS, a column address signal /CAS, a chip select signal /CS, or the like.

The memory device 120 may be implemented with various memory devices that provide addressable storage locations where the memory controller 110 is allowed to read and/or write data. For example, the memory device 120 may include dynamic random access memory (DRAM) devices, synchronous DRAM (SDRAM) devices, and double data rate (DDR) SDRAM devices.

The memory controller 110 may access the memory device 120 in response to the read and/or write memory transactions of the processor. The operation of accessing the memory device 120 may be dependent on a memory read latency and a memory write latency.

The memory read latency is a time difference between a time point when the memory controller 110 requests the memory device 120 to retrieve data and a time point when the memory device 120 provides the requested retrieved data to the memory controller 110. The memory write latency is a time difference between a time point when the memory controller 110 requests the memory device 120 to write data and a time point when the memory device 120 notifies the memory controller 110 that the writing of the data has been completed. Each of the memory controller 110 and the memory device 120 may operate as a transmitter that transmits data through a DQ bus 130 or as a receive that receives data through the DQ bus 130.

The memory device 120 may include a memory cell array 122 and a symbol lock pattern detector 124. The memory cell array 122 may include a plurality of memory cells arranged in rows and columns (e.g., in a matrix form). Each of the memory cells may include an access transistor and a storage capacitor. Each of the memory cells is arranged at an intersection of a word line and a bit line in a matrix form. Write data provided from the memory controller 110 may be written to some of the memory cells of the memory cell array 122.

In an exemplary embodiment, the memory cell array 122 may be a three-dimensional (3D) memory array. The 3D memory array is monolithically formed as one or more physical levels in memory cells each having an active region which is disposed on a silicon substrate and circuitry. Here, the circuitry may be related to the operation of the memory cells and may be formed on the silicon substrate or in the silicon substrate. The term "monolithically" may be understood to mean that layers of each physical level of the array are directly stacked on the layers of each underlying level of the array.

In an exemplary embodiment, the 3D memory array may include vertical NAND strings arranged in a vertical direction such that at least one memory cell is disposed on another memory cell. The at least one memory cell may include a charge trap layer.

The following patent documents, U.S. Pat. No. 7,679,133, U.S. Pat. No. 8,553,466, U.S. Pat. No. 8,654,587, U.S. Pat. No. 8,559,235, and U.S. Patent Application Publication No. 2011/0233648 disclose exemplary configurations of 3D memory arrays, in which the 3D memory array is formed as multiple levels with word lines and/or bit lines shared between the levels. The disclosures of which are incorporated by reference herein in their entireties.

The symbol lock pattern detector 124 may perform an operation of finding a start point of a write data burst which is provided from the memory controller 110 connected to the symbol lock pattern detector 124 via a multi-lane I/O interface. The multi-lane I/O interface may transmit a symbol lock pattern through one group among a plurality of DQ data lines of the DQ bus 130. During a symbol lock period of a clock signal CLK, the symbol lock pattern detector 124 may detect the symbol lock pattern in response to a write enable signal WR_EN generated from a write command. The symbol lock pattern detector 124 may find the first UI (e.g., the start point) of the write data burst according to the detected symbol lock pattern.

In an exemplary embodiment, the symbol lock pattern detector 124 may detect a plurality of symbol lock patterns during a preamble period of the clock signal CLK through the multi-lane I/O interface, and may generate the write enable signal WR_EN in response to the detected symbol lock patterns. In response to the write enable signal WR_EN, the symbol lock pattern detector 124 may find the first UI of the write data burst according to the detected symbol lock pattern.

In an exemplary embodiment, the symbol lock pattern detector 124 may perform an operation of finding a start point (e.g., first data or first UI) of a write data burst, which is provided from the memory controller 110 connected to the symbol lock pattern detector 124 via a multi-signaling I/O interface. The multi-signaling I/O interface may transmit a symbol lock pattern by applying a voltage level to one of the plurality of DQ data lines of the DQ bus 130.

Figure 2:
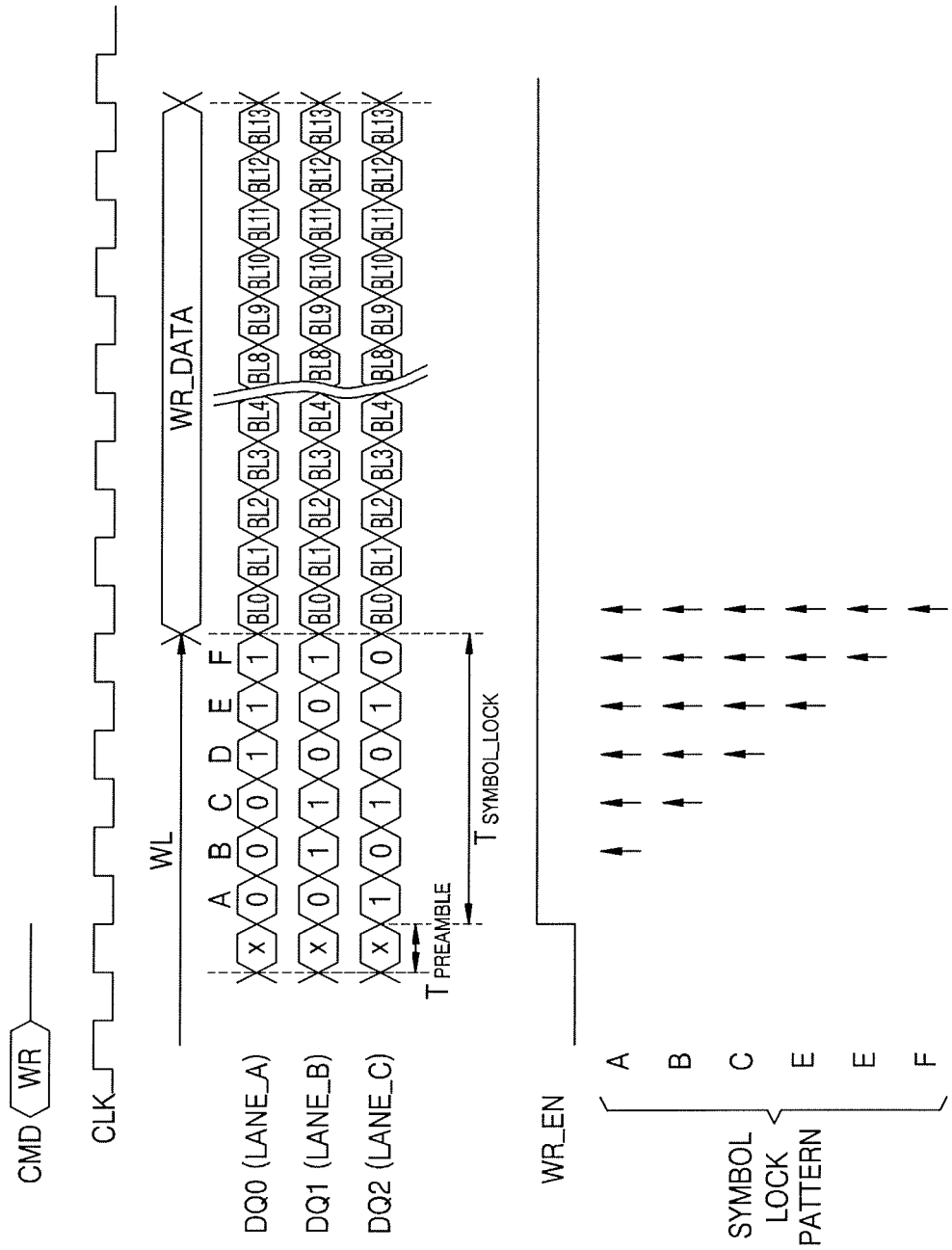
FIG. 2 is a timing diagram for describing a symbol lock method performed by the memory device of FIG. 1 according to an exemplary embodiment of the present inventive concept.

FIG. 2 is a timing diagram for describing a symbol lock method performed by the memory device 120 of FIG. 1 according to an exemplary embodiment of the present inventive concept.

Referring to FIGS. 1 and 2, the memory device 120 may receive a write command WR synchronized with a clock signal CLK. It may be assumed that a write data burst WR_DATA is received after a write latency WL from the reception of the write command WR. The write data burst WR_DATA may be received as a plurality of DQ data through the DQ bus 130. DQ data corresponding to a burst length (BL) may be received as the write data burst WR_DATA.

For simplicity of illustration, it is assumed that three DQ data DQ0, DQ1, and DQ3 are received as the write data burst WR_DATA (e.g., BL0 to BL13), which corresponds to a burst length (BL) of 14. In an exemplary embodiment, the BL may be variously set to, for example, 8, 16, 32, or the like.

The symbol lock method of finding the first UI (e.g., the start point) of the write data burst WR_DATA may be applied to the multi-lane I/O interface. The multi-lane I/O interface sets some of the plurality of DQ data as a single group and uses patterns of the grouped DQ data as symbol lock patterns.

In an exemplary embodiment, the symbol lock method may be applied to the multi-signaling I/O interface that uses voltage levels that are applied to a single DQ data line as symbol lock patterns. In the multi-signaling I/O interface, the voltage level of the DQ data line may be converted into a digital signal through an analog/digital (A/D) converter, and the symbol lock pattern may be detected based on the converted digital signal.

As an example of the multi-lane I/O interface, DQ data DQ0, DQ1, and DQ2 may be set as a single group. Lines LANE_A, LANE_B, and LANE_C may transfer the DQ data DQ0, DQ1, and DQ2, respectively. The lanes LANE_A, LANE_B, and LANE_C may constitute multi-lanes. In an exemplary embodiment, the multi-lanes may include a line that transfers other DQ data besides the DQ data DQ0, DQ1, and DQ2.

After the write latency WL has passed from the reception of the write command WR, data BL0 to BL13 corresponding to the write data burst WR_DATA may be received through the multi-lanes LANE_A, LANE_B, and LANE_C. During the write latency WL, the symbol lock patterns may be transferred through the multi-lanes LANE_A, LANE_B, and LANE_C. The symbol lock patterns may be provided as various combinations of data bits transferred through the multi-lanes LANE_A, LANE_B, and LANE_C. For example, in a case where the data bits transferred through the multi-lanes LANE_A, LANE_B, and LANE_C are "0-0-1", the data bits (e.g., "0-0-1") may be a symbol lock pattern A. In a case where the data bits transferred through the multi-lanes LANE_A, LANE_B, and LANE_C are "0-1-0", the data bits (e.g., "0-1-0") may be a symbol lock pattern B. In a case where the data bits transferred through the multi-lanes LANE_A, LANE_B, and LANE_C are "0-1-1", the data bits (e.g., "0-1-1") may be a symbol lock pattern C. In a case where the data bits transferred through the multi-lanes LANE_A, LANE_B, and LANE_C are "1-0-0", the data bits (e.g., "1-0-0") may be a symbol lock pattern D. In a case where the data bits transferred through the multi-lanes LANE_A, LANE_B, and LANE_C are "1-0-1", the data bits (e.g., "1-0-1") may be a symbol lock pattern E. In a case where the data bits transferred through the multi-lanes LANE_A, LANE_B, and LANE_C are "1-1-0", the data bits (e.g., "1-1-0") may be a symbol lock pattern F.

Each of the symbol lock patterns A to F may be transferred through the multi-lanes LANE_A, LANE_B, and LANE_C during a symbol lock period $T_{SYMBOL\_LOCK}$ before the data BL0 to BL13 corresponding to the write data burst WR_DATA are transferred. The data BL0 to BL13 corresponding to the write data burst WR_DATA may be transferred through each of the multi-lanes LANE_A, LANE_B, and LANE_C in synchronization with edges of the clock signal CLK.

The clock signal CLK may have a preamble period $T_{PREAMBLE}$ and the symbol lock period $T_{SYMBOL\_LOCK}$ before the data BL0 to BL13 are transferred. The symbol lock period $T_{SYMBOL\_LOCK}$ may be defined as a period until the data BL0 to BL13 are transferred after the activation of the write enable signal WR_EN. The write enable signal WR_EN may be activated after the preamble period $T_{PREAMBLE}$ of the clock signal CLK. In an exemplary embodiment, both the preamble period $T_{PREAMBLE}$ and the symbol lock period $T_{SYMBOL\_LOCK}$ may be referred to as a preamble period.

During the symbol lock period $T_{SYMBOL\_LOCK}$, in a case where the symbol lock pattern detector 124 detects the symbol lock pattern transferred through the multi-lanes LANE_A, LANE_B, and LANE_C as the symbol lock pattern A, data (e.g., BL0) of the multi-lanes LANE_A, LANE_B, and LANE_C synchronized with a sixth edge of the clock signal CLK from the detection time of the symbol lock pattern A may be determined as the first UI of the write data burst WR_DATA. In a case where the symbol lock pattern detector 124 detects the symbol lock pattern transferred through the multi-lanes LANE_A, LANE_B, and LANE_C as the symbol lock pattern B, data (e.g., BL0) of the multi-lanes LANE_A, LANE_B, and LANE_C synchronized with a fifth edge of the clock signal CLK from the detection time of the symbol lock pattern B may be determined as the first UI of the write data burst WR_DATA. In a case where the symbol lock pattern detector 124 detects the symbol lock pattern transferred through the multi-lanes LANE_A, LANE_B, and LANE_C as the symbol lock pattern C, data (e.g., BL0) of the multi-lanes LANE_A, LANE_B, and LANE_C synchronized with a fourth edge of the clock signal CLK from the detection time of the symbol lock pattern C may be determined as the first UI of the write data burst WR_DATA.

In a case where the symbol lock pattern detector 124 detects the symbol lock pattern transferred through the multi-lanes LANE_A, LANE_B, and LANE_C as the symbol lock pattern D, data (e.g., BL0) of the multi-lanes LANE_A, LANE_B, and LANE_C synchronized with a third edge of the clock signal CLK from the detection time of the symbol lock pattern D may be determined as the first UI of the write data burst WR_DATA. In a case where the symbol lock pattern detector 124 detects the symbol lock pattern transferred through the multi-lanes LANE_A, LANE_B, and LANE_C as the symbol lock pattern E, data (e.g., BL0) of the multi-lanes LANE_A, LANE_B, and LANE_C synchronized with a second edge of the clock signal CLK from the detection time of the symbol lock pattern E may be determined as the first UI of the write data burst WR_DATA. In a case where the symbol lock pattern detector 124 detects the symbol lock pattern transferred through the multi-lanes LANE_A, LANE_B, and LANE_C as the symbol lock pattern F, data (e.g., BL0) of the multi-lanes LANE_A, LANE_B, and LANE_C synchronized with a first edge of the clock signal CLK from the detection time of the symbol lock pattern F may be determined as the first UI of the write data burst WR_DATA.

In an exemplary embodiment, there is provided a method of determining the first UI (e.g., BL0) of the write data burst WR_DATA according to the symbol lock patterns A to F transferred during the symbol lock period $T_{SYMBOL\_LOCK}$. In an exemplary embodiment, the first UI (e.g., BL0) of the write data burst WR_DATA may be determined by using symbol lock patterns other than the symbol lock patterns A to F.

Figure 3:
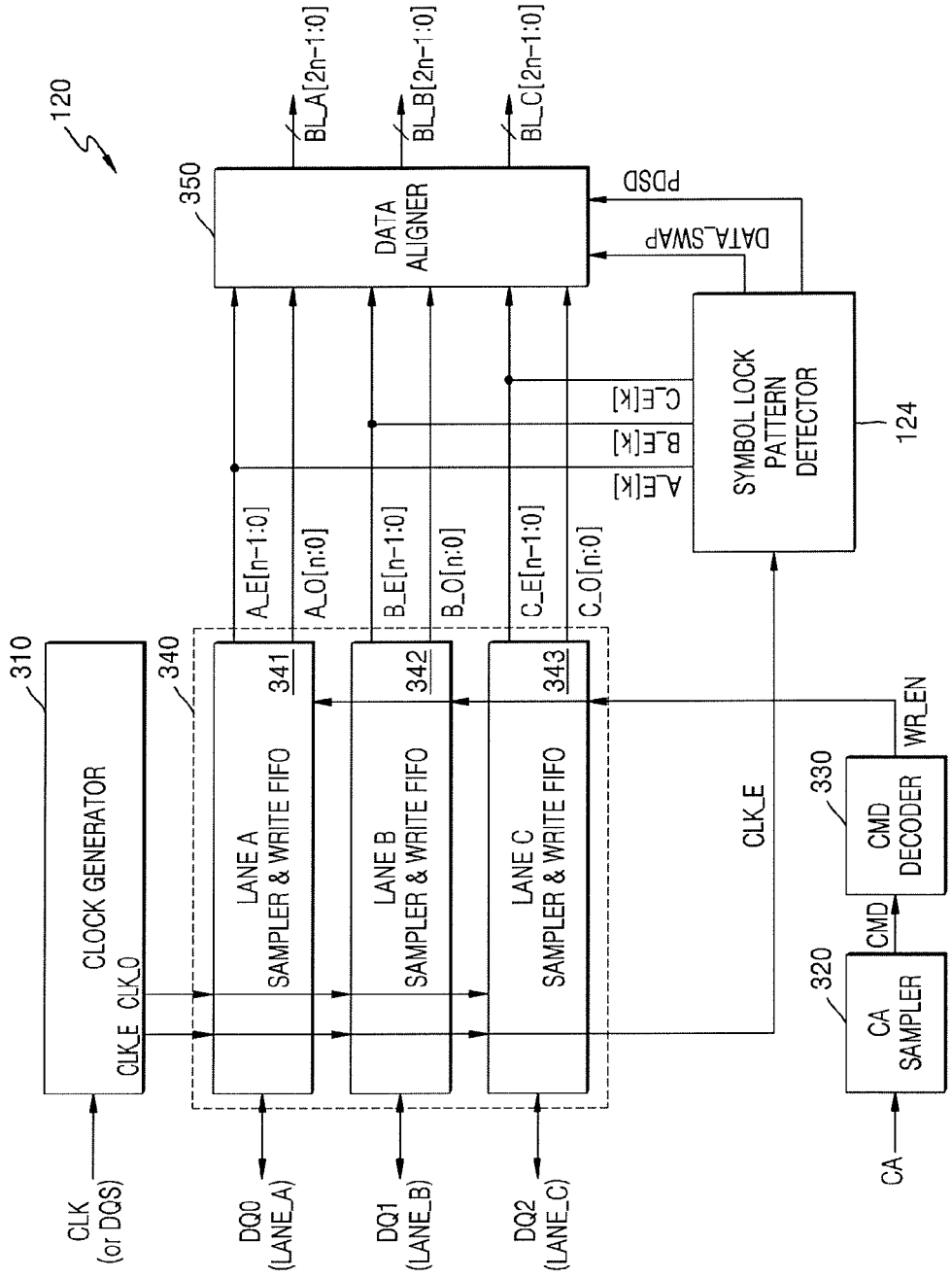
FIG. 3 is a block diagram illustrating a memory device of FIG. 1 including a symbol lock pattern detector according to an exemplary embodiment of the present inventive concept.
Figure 4:
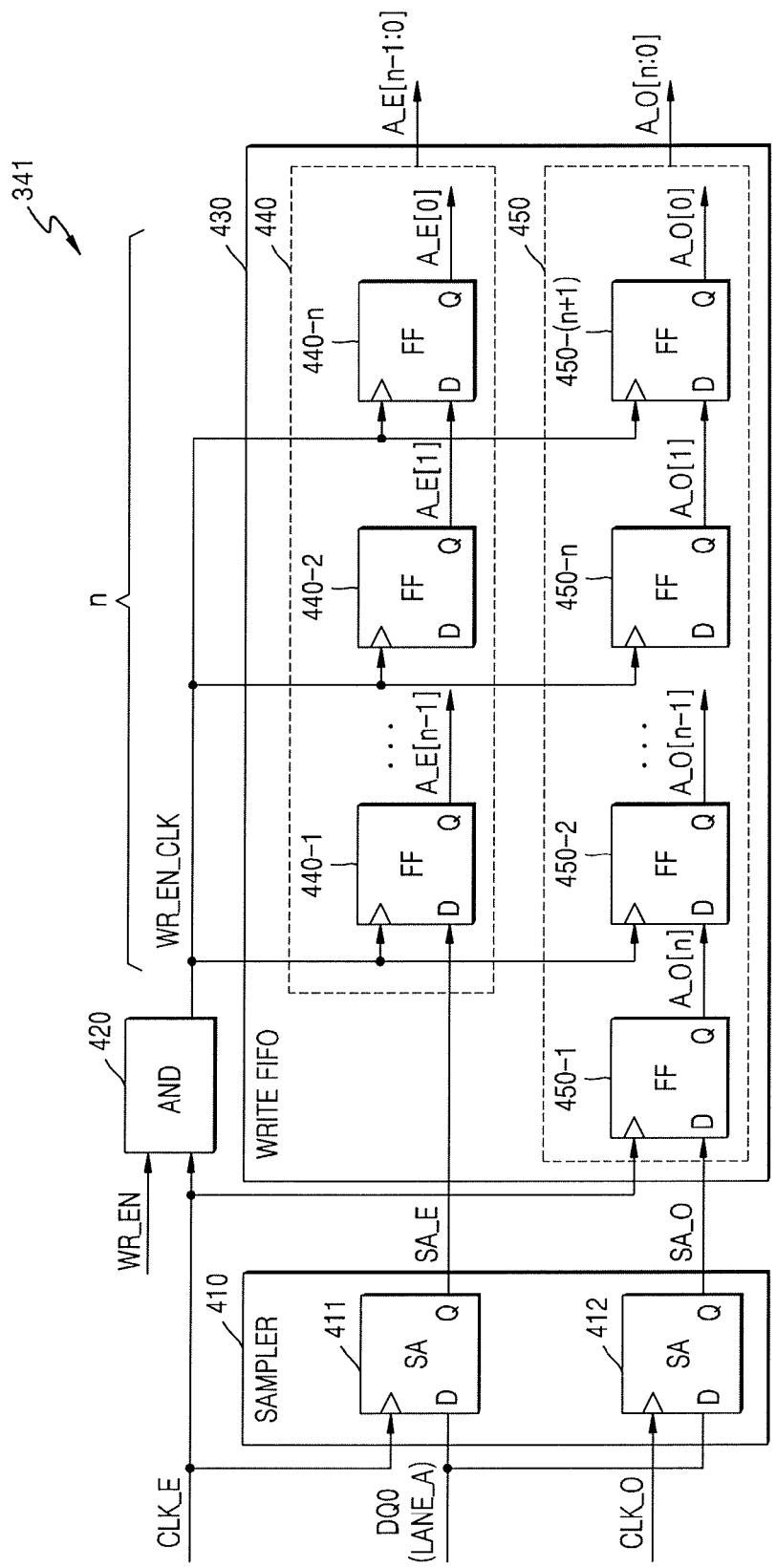
FIG. 4 is a block diagram of a first lane sampler and write first-in first-out (FIFO) of FIG. 3 according to an exemplary embodiment of the present inventive concept.

FIG. 3 is a block diagram illustrating a memory device 120 of FIG. 1 including a symbol lock pattern detector 124 according to an exemplary embodiment of the present inventive concept. FIG. 4 is a block diagram of a first lane sampler and write FIFO 341 of FIG. 3 according to an exemplary embodiment of the present inventive concept, and FIG. 5 is a timing diagram for describing an operation of the first lane sampler and write FIFO 341 of FIG. 3 according to an exemplary embodiment of the present inventive concept.

Referring to FIG. 3, the memory device 120 may generate the write enable signal WR_EN in response to the write command WR, detect a symbol lock pattern during the symbol lock period $T_{SYMBOL\_LOCK}$, and generate a data latch signal PDSD based on the detected symbol lock pattern. The memory device 120 may include a clock generator 310, a command/address (CA) sampler 320, a command decoder 330, a sampler and write first-in first-out (FIFO) 340, a data aligner 350, and the symbol lock pattern detector 124.

The clock generator 310 may receive the clock signal CLK and generate a first clock signal CLK_E and a second clock signal CLK_O based on the clock signal CLK. In an exemplary embodiment, the clock generator 310 may receive the data strobe signal DQS, instead of the clock signal CLK, and generate the first clock signal CLK_E and the second clock signal CLK_O based on the data strobe signal DQS.

Figure 5:
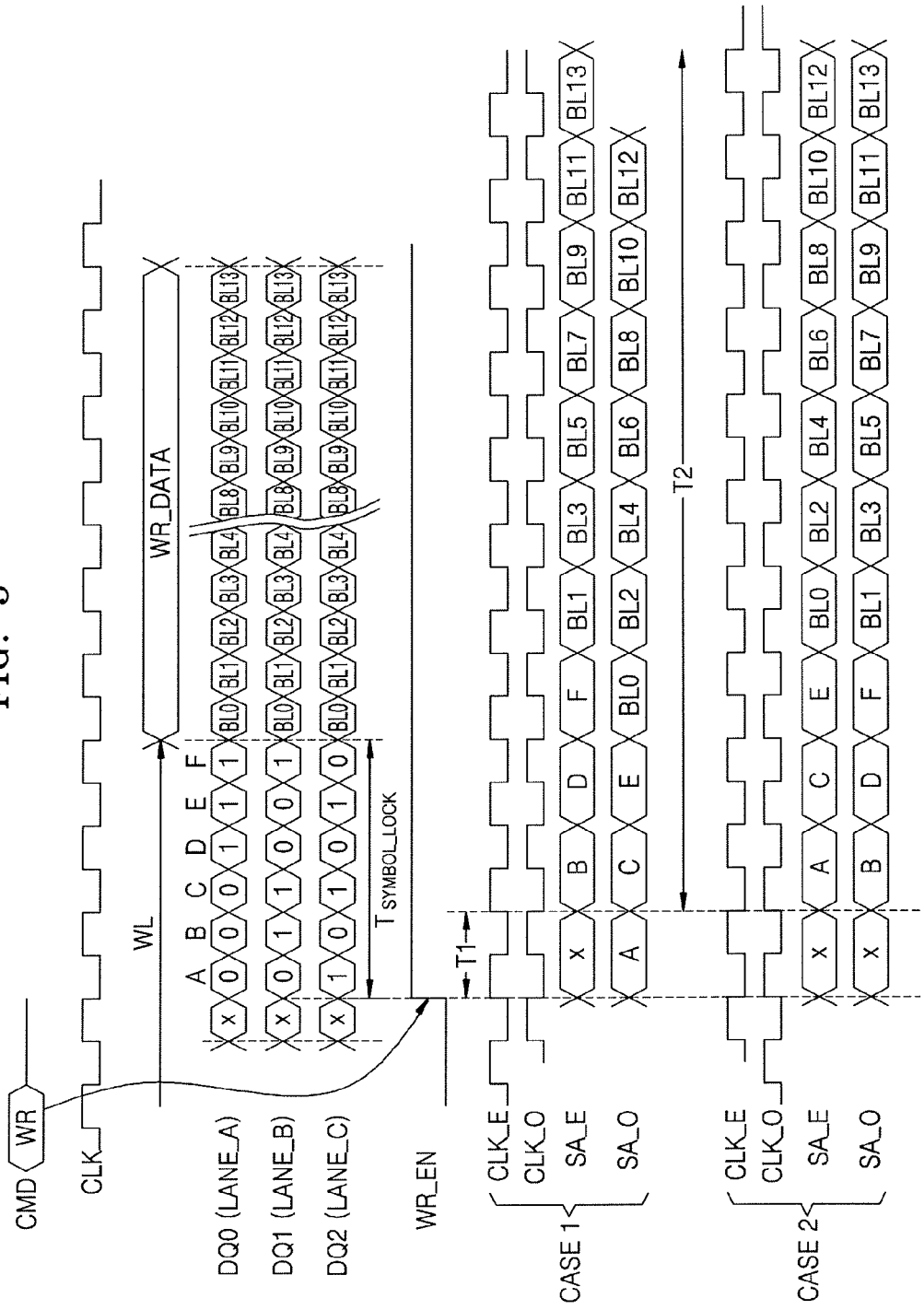
FIG. 5 is a timing diagram for describing an operation of the first lane sampler and write FIFO of FIG. 3 according to an exemplary embodiment of the present inventive concept.

Referring to FIG. 5, the first clock signal CLK_E may be transitioned to a logic high level at an even edge (e.g., a falling edge) of the clock signal CLK and may toggle in logic level at each edge of the clock signal CLK. The second clock signal CLK_O may be transitioned to a logic high level at an odd edge (e.g., a rising edge) of the clock signal CLK and may toggle in logic level at each edge of the clock signal CLK. In an exemplary embodiment, as illustrated with CASE 1 of FIG. 5, the first clock signal CLK_E may be transitioned to a logic high level in synchronization with even edges (0, 2, 4, . . . ), e.g., falling edges, of the clock signal CLK, and the second clock signal CLK_O may be transitioned to a logic high level in synchronization with odd edges (1, 3, 5, . . . ), e.g., rising edges, of the clock signal CLK.

In an exemplary embodiment, as illustrated with CASE 2 of FIG. 5, the first clock signal CLK_E may be transitioned to a logic high level in synchronization with odd edges (1, 3, 5, . . . ), e.g., rising edges, of the clock signal CLK, and the second clock signal CLK_O may be transitioned to a logic high level in synchronization with even edges (0, 2, 4, . . . ), e.g., falling edges, of the clock signal CLK.

Referring back to FIG. 3, the CA sampler 320 may separate a command CMD and an address from the command/address CA received in time series. The command CMD may be provided to the command decoder 330 and the address may be provided to an address decoder through an address register. The address decoder may activate word lines and bit lines of the memory cell array (e.g., 122 in FIG. 1). Outputs BL_A[2n−1:0], BL_B[2n−1:0], and BL_C[2n−1:0] of the data aligner 350 may be written to memory cells, each of which is connected to each of the activated word lines and each of the activated bit lines. Here, n is an integer equal to or greater than one.

The command decoder 330 may decode the command CMD and generate control signals corresponding to the command CMD. As illustrated in FIG. 5, the command decoder 330 may generate the write enable signal WR_EN of a high level in response to the write command WR. The write enable signal WR_EN may be provided to the sampler and write FIFO 340.

The sampler and write FIFO 340 may include first to third lane samplers and write FIFOs 341, 342, and 343 controlled by the first and second clock signals CLK_E and CLK_O and the write enable signal WR_EN.

The first lane sampler and write FIFO 341 may be connected to a first lane LANE_A through which the data DQ0 is transferred, and output a first write FIFO output A_E[n−1:0] and a second write FIFO output A_O[n:0] based on the data DQ0 in response to the write enable signal WR_EN and the first and second clock signals CLK_E and CLK_O.

The second lane sampler and write FIFO 342 may be connected to a second lane LANE_B through which the data DQ1 is transferred, and output a first write FIFO output B_E[n−1:0] and a second write FIFO output B_O[n:0] based on the data DQ1 in response to the write enable signal WR_EN and the first and second clock signals CLK_E and CLK_O.

The third lane sampler and write FIFO 343 may be connected to a third lane LANE_C through which the data DQ2 is transferred, and output a first write FIFO output C_E[n−1:0] and a second write FIFO output C_O[n:0] based on the data DQ2 in response to the write enable signal WR_EN and the first and second clock signals CLK_E and CLK_O.

The symbol lock pattern detector 124 may store a plurality of symbol lock patterns. The symbol lock pattern detector 124 may receive the first write FIFO outputs A_E[k], B_E[k], and C_E[k] (here, 0≤k≤n), compare the first write FIFO outputs A_E[k], B_E[k], and C_E[k] with each of the stored symbol lock patterns, and may detect a symbol lock pattern which is matched to the received first write FIFO outputs A_E[k], B_E[k], and C_E[k] among the stored symbol lock patterns. Each of the first write FIFO outputs A_E[k], B_E[k], and C_E[k] may be output from each of the first to third lane samplers and write FIFOs 341 to 343. The symbol lock pattern detector 124 may generate a data swap signal DATA_SWAP and a data latch signal PDSD based on the detected symbol lock pattern.

The data aligner 350 may align the first and second write FIFO outputs A_E[n−1:0] and A_O[n:0] of the first sampler and write FIFO 341, and output the aligned outputs A_E[n−1:0] and A_O[n:0] in parallel (e.g., BL_A [2n−1:0]) in response to the data swap signal DATA_SWAP and the data latch signal PDSD. In addition, the data aligner 350 may align the first and second write FIFO outputs B_E[n−1:0] and B_O[n:0] of the second sampler and write FIFO 342, and output the aligned outputs B_E[n−1:0] and B_O[n:0] in parallel (e.g., BL_B [2n−1:0]) in response to the data swap signal DATA_SWAP and the data latch signal PDSD. The data aligner 350 may align the first and second write FIFO outputs C_E[n−1:0] and C_O[n:0] of the third sampler and write FIFO 343, and output the aligned outputs C_E[n−1:0]

and C_O[n:0] in parallel (e.g., BL_C [2n−1:0]) in response to the data swap signal DATA_SWAP and the data latch signal PDSD.

The configuration of the first lane sampler and write FIFO 341 of FIG. 4 may be substantially identical to the configurations of each of the second and third lane samplers and write FIFOs 342 and 343 of FIG. 3. The description about the operation of the first lane sampler and write FIFO 341 may be applied to each of the second and third lane samplers and write FIFOs 342 and 343.

Referring to FIG. 4, the first lane sampler and write FIFO 341 may include the sampler 410, a logic circuit 420, and a write FIFO 430. The sampler 410 may include first and second samplers 411 and 412 that receive the data DQ0 of the first lane LANE_A in response to the first clock signal CLK_E and the second clock signal CLK_O.

The first sampler 411 may latch the data DQ0 in response to a rising edge of the first clock signal CLK_E, and output the data DQ0 as a first sampler output SA_E. The second sampler 412 may latch the data DQ0 in response to a rising edge of the second clock signal CLK_O, and output the data DQ0 as a second sampler output SA_O.

As illustrated with CASE 1 of FIG. 5, the sampler 410 may output data "x-B-D-F-BL1-BL3-BL5-BL7-BL9-BL11-BL13" as the first sampler output SA_E in response to the rising edges of the first clock signal CLK_E, and output data "A-C-E-BL0-BL2-BL4-BL6-BL8-BL10-BL12" as the second sampler output SA_O in response to the rising edges of the second clock signal CLK_O. The character "x" may be understood as unknown data (e.g., invalid data). When the first and second samplers 411 and 412 outputs invalid data x and valid data A as SA_E and SA_O, the data aligner (e.g., 350 in FIG. 3) may not align serial data to parallel data due to the invalid data X.

As illustrated with CASE 2 of FIG. 5, the sampler 410 may output data "x-A-C-E-BL0-BL2-BL4-BL6-BL8-BL10-BL12" as the first sampler output SA_E in response to the rising edges of the first clock signal CLK_E, and output data "x-B-D-F-BL1-BL3-BL5-BL7-BL9-BL11-BL13" as the second sampler output SA_O in response to the rising edges of the second clock signal CLK_O. When both the first and second samplers 411 and 412 output valid data (e.g., A to F) as SA_E and SA_O, the data aligner (e.g., 350 in FIG. 3) aligns serial data to parallel data.

The logic circuit 420 may perform a logical AND operation on the write enable signal WR_EN and the first clock signal CLK_E, and may generate a write enable clock signal WR_EN_CLK. The write enable clock signal WR_EN_CLK may be provided to the write FIFO 430 to latch the first and second sampler outputs SA_E and SA_O.

The write FIFO 430 may include a first write FIFO 440 and a second write FIFO 450. The first write FIFO 440 may sequentially latch and serially output the first sampler output SA_E in response to the first clock signal CLK_E. The second write FIFO 450 may sequentially latch and serially output the second sampler output SA_O in response to the first clock signal CLK_E or the write enable clock signal WR_EN_CLK.

The first write FIFO 440 may sequentially latch the first sampler output SA_E in response to the write enable clock signal WR_EN_CLK, and output the first write FIFO output A_E[n−1:0] (e.g., n=BL/2 and BL=14). The second write FIFO 450 may sequentially latch the second sampler output SA_O in response to the first clock signal CLK_E or the write enable clock signal WR_EN_CLK, and output the second write FIFO output A_O[n:0].

The first write FIFO 440 may include a plurality of flip-flops 440-1 to 440-n connected in series to sequentially latch the first sampler output SA_E. The flip-flop 440-1 may receive the first sampler output SA_E, latch the received first sampler output SA_E, and output the latched first sampler output SA_E in response to the write enable clock signal WR_EN_CLK.

An output A_E[n−1] of the flip-flop 440-1 may be sequentially provided to the series-connected flip-flops 440-2 to 440-n in response to the write enable clock signal WR_EN_CLK. The flip-flop 440-n may latch an output A_E[1] of the flip-flop 440-(n−1) in response to the write enable clock signal WR_EN_CLK, and may output an output A_E[0].

The first write FIFO 440 may serially output a first write FIFO output A_E[n−1:0] through the flip-flops 440-1 to 440-n that sequentially latch the first sampler output SA_E. An output A_E[k], which is output from the first write FIFO 440 during the symbol lock period $T_{SYMBOL\_LOCK}$, may be provided to the symbol lock pattern detector (e.g., 124 in FIG. 3).

The second write FIFO 450 may include a plurality of flip-flops 450-1 to 450-(n+1) connected in series to sequentially latch the second sampler output SA_O. The flip-flop 450-1 may receive the second sampler output SA_O, latch the received second sampler output SA_O, and output the latched second sampler output SA_O in response to the first clock signal CLK_E.

The flip-flop 450-2 of the second write FIFO 450 may latch and output the output A_O[n] of the flip-flop 450-1 in response to the write enable clock signal WR_EN_CLK. An output A_O[n−1] of the flip-flop 450-2 may be sequentially provided to the series-connected flip-flops 450-3 to 450-(n+1) in response to the write enable clock signal WR_EN_CLK. The flip-flop 450-(n+1) of the second write FIFO 450 may latch an output A_O[1] of the flip-flop 450-n in response to the write enable clock signal WR_EN_CLK, and may output an output A_O[0].

The second write FIFO 450 may serially output a second write FIFO output A_O[n:0] through the flip-flops 450-1 to 450-(n+1) that sequentially latch the second sampler output SA_O.

As described with reference to FIGS. 4 and 5, the first lane sampler and write FIFO 341 may receive the data DQ0, and serially output each of the first write FIFO output A_E[n−1:0] and the second write FIFO output A_O[n:0] in response to the first and second clock signals CLK_E and CLK_O and the write enable clock signal WR_EN_CLK. In addition, the second lane sampler and write FIFO (e.g., 342 in FIG. 3) may receive the data DQ1, and serially output the first write FIFO output B_E[n−1:0] and the second write FIFO output B_O[n:0] in response to the first and second clock signals CLK_E and CLK_O and the write enable clock signal WR_EN_CLK. The third lane sampler and write FIFO (e.g., 343 in FIG. 3) may receive the data DQ2, and serially output the first write FIFO output C_E[n−1:0] and the second write FIFO output C_O[n:0] in response to the first and second clock signals CLK_E and CLK_O and the write enable clock signal WR_EN_CLK.

An output B_E[k], which is output from the second write FIFO 342 during the symbol lock period $T_{SYMBOL\_LOCK}$, may be provided to the symbol lock pattern detector 124. In addition, an output C_E[k], which is output from the third write FIFO 343 during the symbol lock period $T_{SYMBOL\_LOCK}$, may be provided to the symbol lock pattern detector 124. The symbol lock pattern detector 124 may receive the output A_E[k] of the first lane sampler and write FIFO 341, the output B_E[k] of the second lane sampler and write FIFO 342, and the output C_E[k] of the third lane sampler and write FIFO 343, and determine whether the outputs A_E[k], B_E[k], and C_E[k] match with each of the stored symbol lock patterns.

Figure 6:
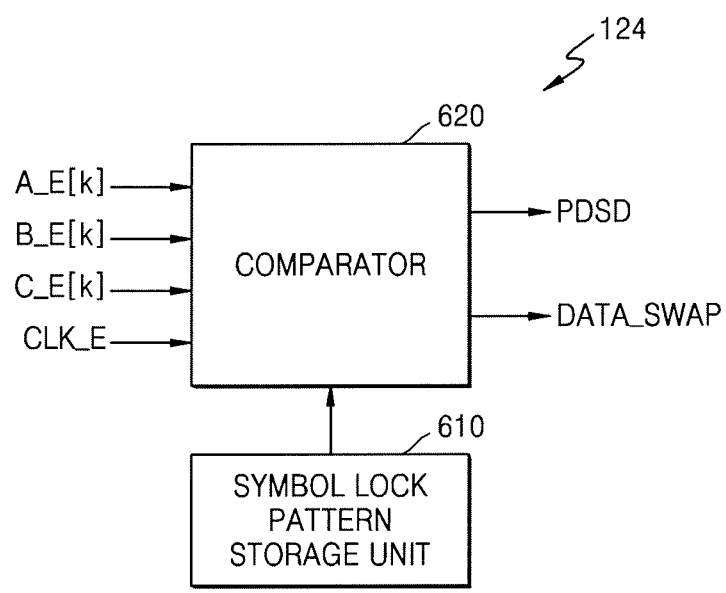
FIG. 6 is a block diagram of the symbol lock pattern detector of FIG. 3 according to an exemplary embodiment of the present inventive concept.
Figure 7:
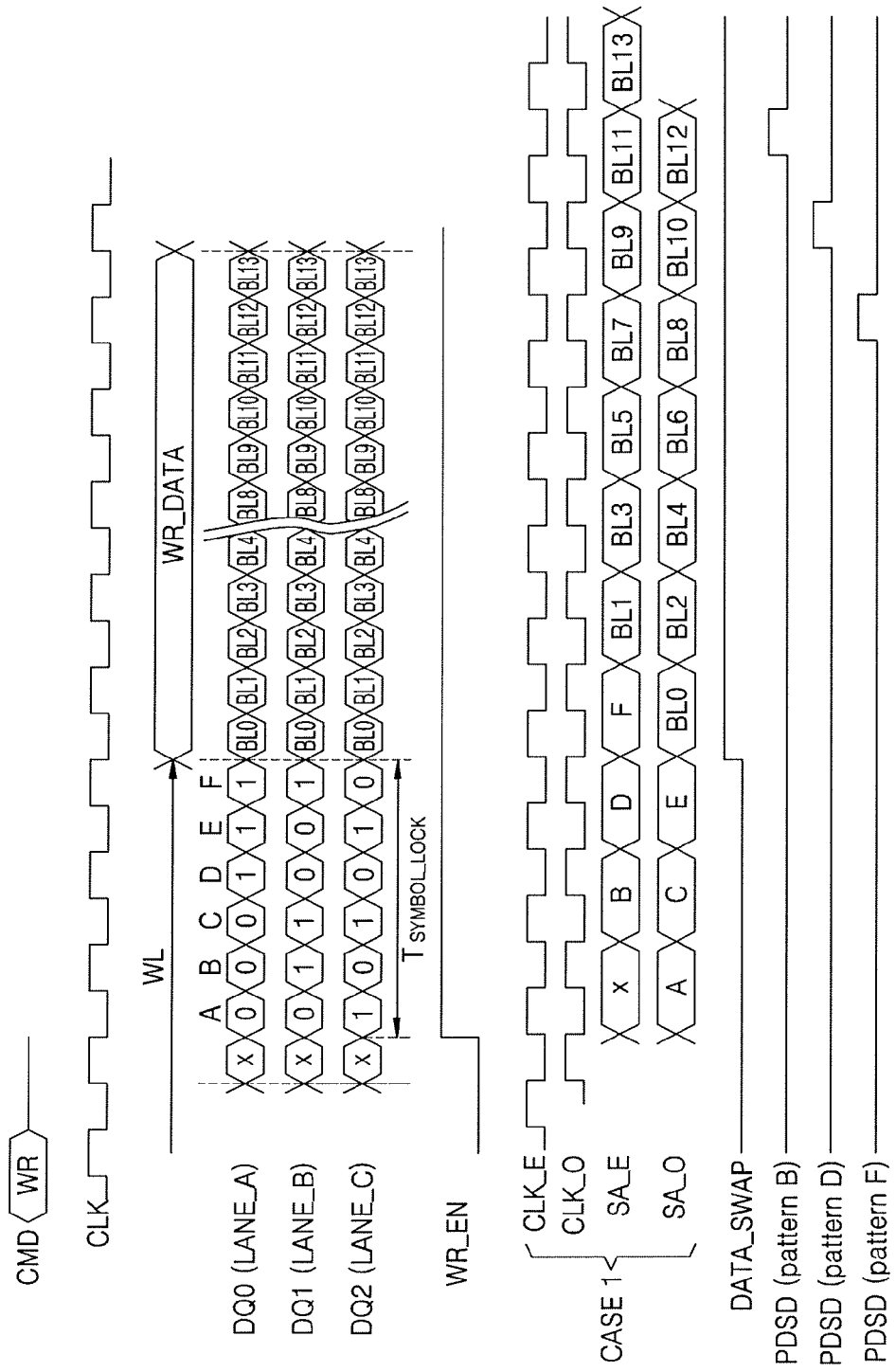
FIG. 7 is a timing diagram for describing an operation of the symbol lock pattern detector of FIG. 3 according to an exemplary embodiment of the present inventive concept.
Figure 8:
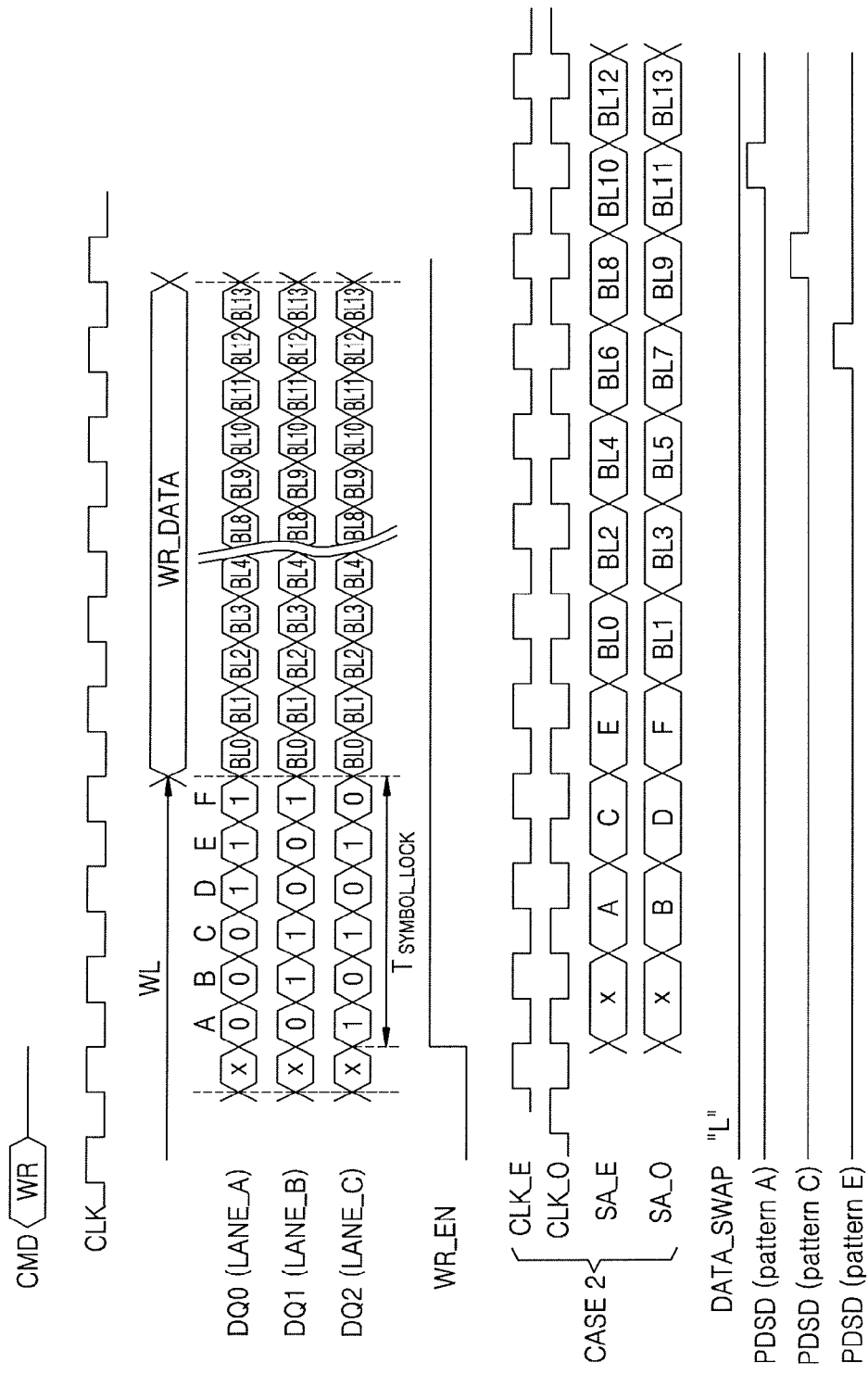
FIG. 8 is a timing diagram for describing an operation of the symbol lock pattern detector of FIG. 3 according to an exemplary embodiment of the present inventive concept.

FIG. 6 is a block diagram of the symbol lock pattern detector 124 of FIG. 3 according to an exemplary embodiment of the present inventive concept, FIG. 7 is a timing diagram for describing an operation of the symbol lock pattern detector 124 of FIG. 3 according to an exemplary embodiment of the present inventive concept, and FIG. 8 is a timing diagram for describing an operation of the symbol lock pattern detector 124 of FIG. 3 according to an exemplary embodiment of the present inventive concept.

Referring to FIG. 6, the symbol lock pattern detector 124 may include a symbol lock pattern storage unit 610 and a comparator 620. The symbol lock pattern storage unit 610 may store a plurality of symbol lock patterns. For example, the symbol lock pattern storage unit 610 may store the symbol lock patterns A to F to be compared with data bits transferred through the multi-lanes LANE_A, LANE_B, and LANE_C as described above with reference to FIG. 2.

The comparator 620 may compare the first write FIFO outputs A_E[k], B_E[k], and C_E[k] with each of the symbol lock patterns (e.g., the symbol lock patterns A to F) stored in the symbol lock pattern storage unit 610. The comparator 620 may detect a symbol lock pattern which is matched to the received first write FIFO outputs A_E[k], B_E[k], and C_E[k] among the stored symbol lock patterns.

In an exemplary embodiment, the comparator 620 may compare the second write FIFO outputs A_O[k], B_O[k], and C_O[k] with each of the symbol lock patterns stored in the symbol lock pattern storage unit 610, and detect a symbol lock pattern which is matched to the received second write FIFO outputs A_O[k], B_O[k], and C_O[k] among the stored symbol lock patterns. Each of the second write FIFO outputs A_O[k], B_O[k], and C_O[k] may be output from a corresponding one of the first to third lane samplers and write FIFOs 341 to 343 in response to the second clock signal CLK_O.

The comparator 620 may generate the data swap signal DATA_SWAP and the data latch signal PDSD based on the detected symbol lock pattern. The data swap signal DATA_SWAP and the data latch signal PDSD may be provided to the data aligner (e.g., 350 in FIG. 3). The data aligner 350 may align the first and second write FIFO outputs A_E[n−1:0] and A_O[n:0] of the first sampler and write FIFO 341, and output the aligned outputs A_E[n−1:0] and A_O[n:0] in parallel in response to the data swap signal DATA_SWAP and the data latch signal PDSD. In addition, the data aligner 350 may align the outputs B_E[n−1:0] and B_O[n:0] of the second sampler and write FIFO 342, and output the aligned outputs B_E[n−1:0] and B_O[n:0] in parallel in response to the data swap signal DATA_SWAP and the data latch signal PDSD. The data aligner 350 may align the first and second write FIFO outputs C_E[n−1:0] and C_O[n:0] of the third sampler and write FIFO 343, and output the aligned outputs C_E[n−1:0] and C_O[n:0] in parallel in response to the data swap signal DATA_SWAP and the data latch signal PDSD.

As can be seen at a period T1 of CASE 1 of FIG. 5, the first sampler 411 may output the unknown data x (e.g., invalid data) as an output SA_E in response to the first clock signal CLK_E, the second sampler 412 may output valid data A as an output SA_O in response to the second clock signal CLK_O. In this case, since one of the first sampler output SA_E and the second sampler output SA_O is not valid data pair, the data aligner 350 might not work properly to output valid data in parallel. Thus, as can be seen at CASE 2 of FIG. 5, the data swap signal DATA_SWAP may be provided such that both the first sampler output SA_E and the second sampler output SA_O are valid data (e.g., during the period T1) or invalid data in response (e.g., during a period T2) to the first and second clock signals CLK_E and CLK_O.

The data latch signal PDSD may be generated based on the symbol lock pattern which is detected as a matched symbol lock pattern through the comparator 620. As illustrated in FIG. 7, when the symbol lock pattern is detected as F-D-B, data latch signals PDSD, which respectively correspond to the detected symbol lock patterns (e.g., symbol lock patterns F, D, and B), may sequentially be generated at an interval of one cycle of the first clock signal CLK_E. As illustrated in FIG. 8, when the symbol lock pattern is detected as E-C-A, the data latch signals PDSD, which respectively correspond to the detected symbol lock patterns (e.g., symbol lock patterns E, C, and A), may sequentially be generated at an interval of one cycle of the first clock signal CLK_E. This corresponds to the operation of determining the first UI of the write data burst WR_DATA according to the symbol lock patterns A to F by the symbol lock pattern detector 124, as described above with reference to FIG. 2.

FIG. 7 is a timing diagram for describing the operation with reference to CASE 1 of FIG. 5. Referring to FIG. 7, the first and second sampler outputs SA_E and SA_O are output as a pair of invalid data X and valid data A during, e.g., a time T1. The data swap signal DATA_SWAP may be activated (e.g., transitioned to a logic high level) so that two valid data "A-B" are output in response to the first and second clock signals CLK_E and CLK_O, respectively. For example, the data swap signal DATA_SWAP may be activated to a logic high level at a rising edge of the first clock signal CLK_E. This rising edge may correspond to the first UI (e.g., BL0) of the write data burst WR_DATA according to the symbol lock pattern detection result of the comparator 620. Data latch signals PDSD, which respectively correspond to the detected symbol lock patterns F, D, and B, may be sequentially generated (e.g., activated) at an interval of one cycle of the first clock signal CLK_E.

FIG. 8 is a timing diagram for describing the operation with reference to CASE 2 of FIG. 5. Referring to FIG. 8, both the first and second sampler outputs SA_E and SA_O are output as a pair of valid data (e.g., A and B) in response to the first and second clock signals CLK_E and CLK_O, respectively. The data latch signals PDSD, which respectively correspond to the detected symbol lock patterns E, C, and A, may sequentially be generated at an interval of one cycle of the first clock signal CLK_E.

Figure 9:
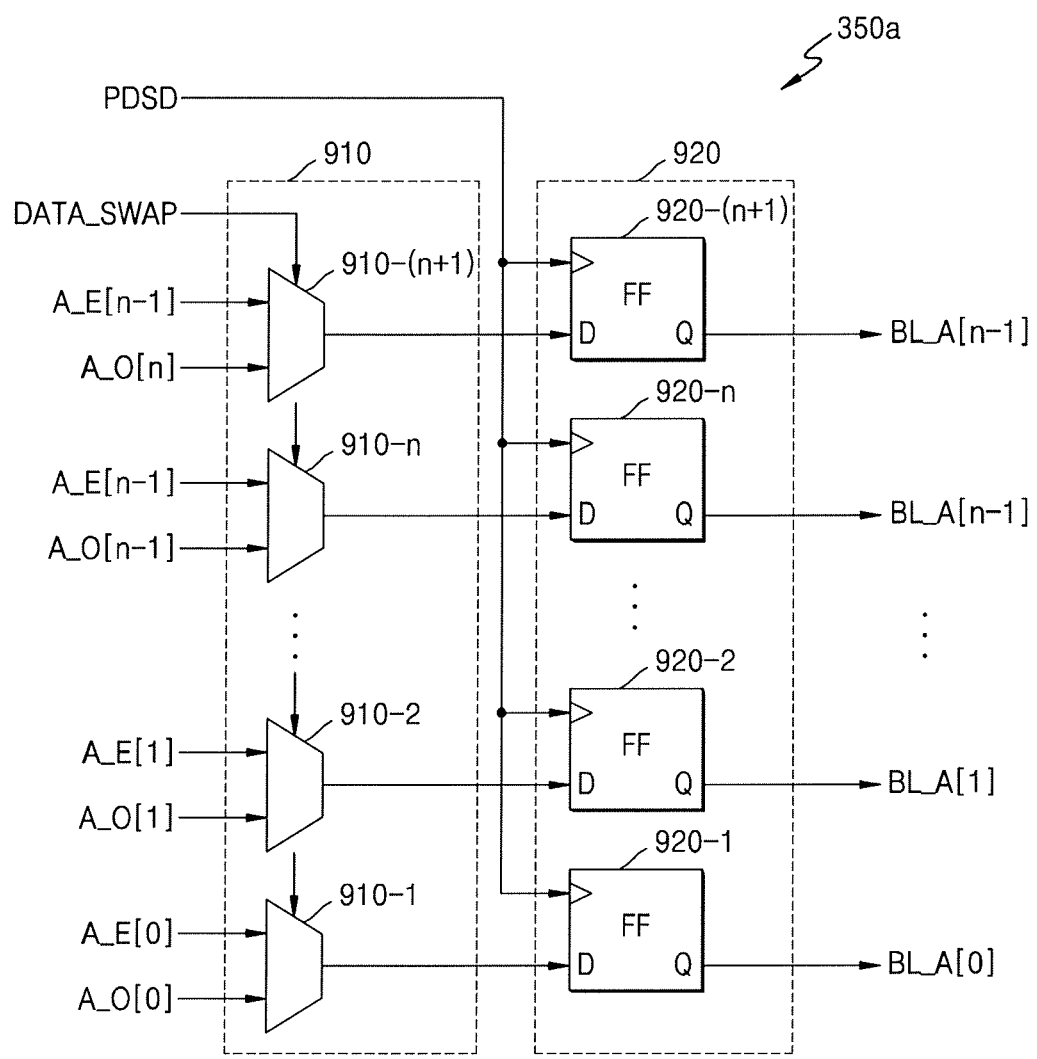
FIG. 9 is a block diagram of a data aligner of FIG. 3 according to an exemplary embodiment of the present inventive concept.
Figure 10:
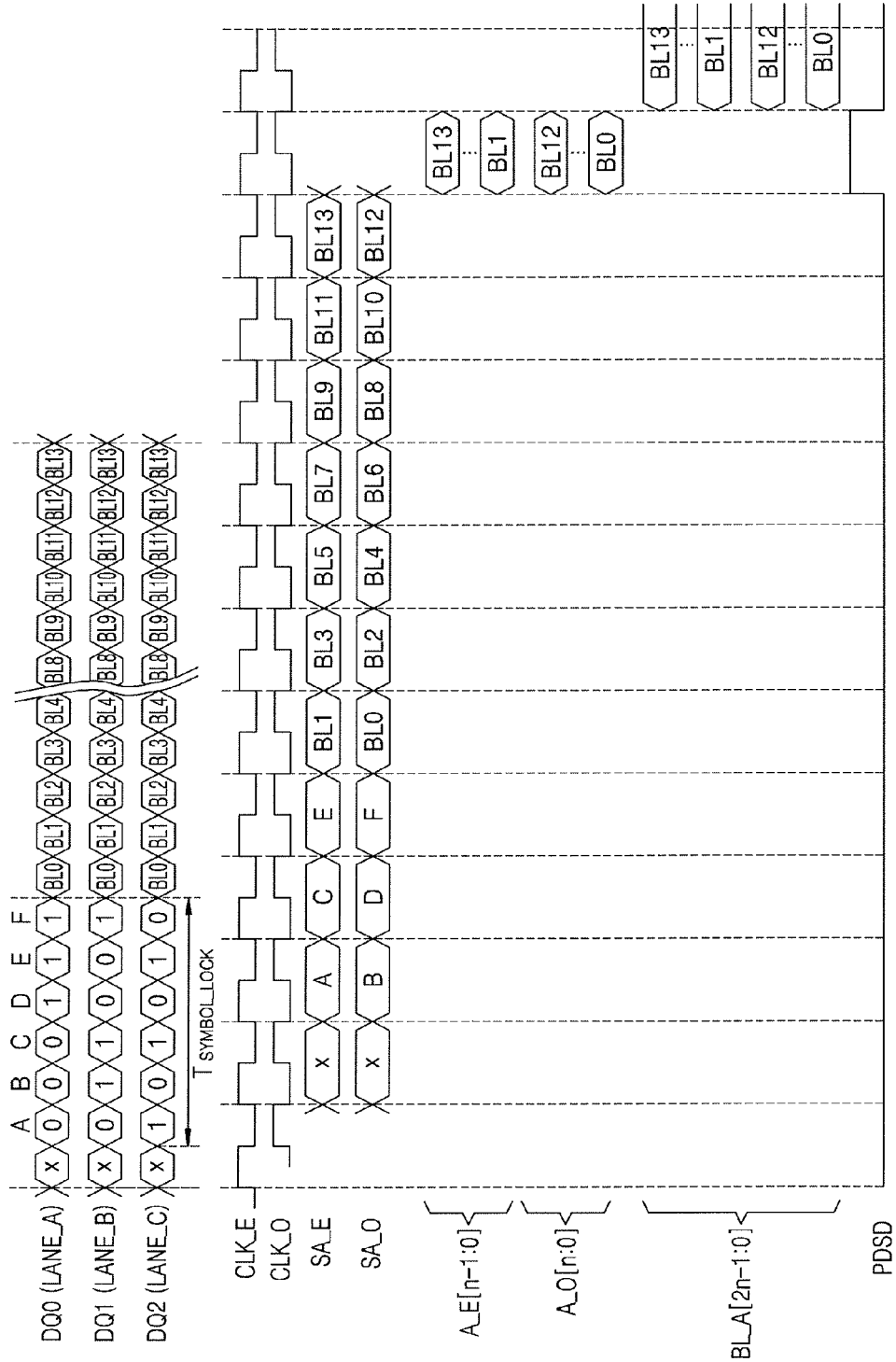
FIG. 10 is a timing diagram for describing an operation of the data aligner of FIG. 3 according to an exemplary embodiment of the present inventive concept.

FIG. 9 is a block diagram of a data aligner 350*a* according to an exemplary embodiment of the present inventive concept. FIG. 10 is a timing diagram for describing an operation of the data aligner 350*a* of FIG. 3 according to an exemplary embodiment of the present inventive concept.

The data aligner 350*a* of FIG. 9 performs the operation of aligning and latching the first write FIFO outputs A_E[n−1:0] and the second write FIFO outputs A_O[n:0] output from the first lane sampler and write FIFO 341 based on the data DQ0. In addition, the data aligner 350*a* performs the operation of aligning and latching the first write FIFO outputs B_E[n−1:0] and the second write FIFO outputs B_O[n:0] output from the second lane sampler and write FIFO 342 based on the data DQ1. The data aligner 350*a* performs the operation of aligning and latching the first write FIFO outputs C_E[n−1:0] and the second write FIFO outputs C_O[n:0] output from the third lane sampler and write FIFO 343 based on the data DQ2.

Referring to FIG. 9, the data aligner 350a may align and latch the first write FIFO outputs A_E[n−1:0] and the second write FIFO outputs A_O[n:0] in response to the data swap signal DATA_SWAP and the data latch signal PDSD, and may output the aligned outputs A_E[n−1:0] and A_O[n:0] as DQ0 write data BL_A[2n−1:0] of the first lane LANE_A. The data aligner 350a may include a first aligner 910 and a second aligner 920.

The first aligner 910 may include a plurality of selectors 910-1 to 910-(n+1), each of which is configured to selectively output one of the first write FIFO output A_E[n−1:0] and the second write FIFO output A_O[n:0] in response to the data swap signal DATA_SWAP.

The selector 910-1 may selectively output one of the first write FIFO output A_E[0] and the second write FIFO output A_O[0] in response to the data swap signal DATA_SWAP. The selector 910-2 may selectively output one of the first write FIFO output A_E[1] and the second write FIFO output A_O[1] in response to the data swap signal DATA_SWAP. The selector 910-n may selectively output one of the first write FIFO output A_E[n−1] and the second write FIFO output A_O[n−1] in response to the data swap signal DATA_SWAP. The selector 910-(n+1) may selectively output one of the first write FIFO output A_E[n−1] and the second write FIFO output A_O[n] in response to the data swap signal DATA_SWAP.

In response to the data swap signal DATA_SWAP, the first aligner 910 may output the first write FIFO outputs A_E[n−1:0] and the second write FIFO outputs A_O[n:0] as a pair without unknown data X (e.g., invalid data), according to the first and second clock signals CLK_E and CLK_O. As illustrated in FIG. 10, the first aligner 910 may output the first write FIFO outputs A_E[n−1:0] (e.g., the data BL1, BL3, . . . , BL9, BL11, BL13) and may output the second write FIFO outputs A_O[n−1:0] (e.g., the data BL0, BL2, . . . , BL8, BL10, BL12).

The second aligner 920 may include a plurality of flip-flops 920-1 to 920-(n+1), each of which is configured to output an output of each of the selectors 910-1 to 910-(n+1) of the first aligner 910 as each of the DQ0 write data BL_A[n−1:0] in response to the data latch signal PDSD.

The flip-flop 920-1 may output the first write FIFO output A_E[0] or the second write FIFO output A_O[0], which is output from the selector 910-1, as DQ0 write data BL_A[0] in response to the data latch signal PDSD. The flip-flop 920-2 may output the first write FIFO output A_E[1] or the second write FIFO output A_O[1], which is output from the selector 910-2, as DQ0 write data BL_A[1] in response to the data latch signal PDSD. The flip-flop 920-n may output the first write FIFO output A_E[n−1] or the second write FIFO output A_O[n−1], which is output from the selector 910-n, as DQ0 write data BL_A[n−1] in response to the data latch signal PDSD. The flip-flop 920-(n+1) may output the first write FIFO output A_E[n−1] or the second write FIFO output A_O[n], which is output from the selector 910-(n+1), as DQ0 write data BL_A[n−1] in response to the data latch signal PDSD.

In response to the data latch signal PDSD, the second aligner 920 may output the first write FIFO output A_E[n−1:0], which is selected by the first aligner 910, as the DQ0 write data BL_A[n−1:0] in parallel, and may output the second write FIFO output A_O[n:0], which is selected by the first aligner 910, as the DQ0 write data BL_A[n−1:0] in parallel. Therefore, the data aligner 350a may output the DQ0 write data BL_A[2n−1:0] corresponding to the write data burst WR_DATA (e.g., BL0 to BL13) in parallel. The DQ0 write data BL_A[2n−1:0] may be written to the memory cell array (e.g., 122 in FIG. 1).

Referring to FIG. 10, in response to the data latch signal PDSD, the data aligner 350a may output the data BL1, BL3, . . . , BL9, BL11, and BL13 corresponding to the first write FIFO outputs A_E[n−1:0] and the data BL0, BL2, . . . , BL8, BL10, and BL12 corresponding to the second write FIFO outputs A_O[n:0] in parallel as the DQ0 write data BL_A[2n−1:0].

Through the data aligner 350a of FIG. 9, the first write FIFO outputs A_E[n−1:0] and the second write FIFO outputs A_O[n:0], which are output based on the data DQ0, may be output in parallel as the DQ0 write data BL_A[2n−1:0]. In addition, through the data aligner 350a, the first write FIFO outputs B_E[n−1:0] and the second write FIFO outputs B_O[n:0], which are output based on the data DQ1, may be output in parallel as the DQ1 write data BL_B[2n−1:0]. Through the data aligner 350a, the first write FIFO outputs C_E[n−1:0] and the second write FIFO outputs C_O[n:0], which are output based on the data DQ2, may be output in parallel as the DQ2 write data BL_C[2n−1:0].

Figure 11:
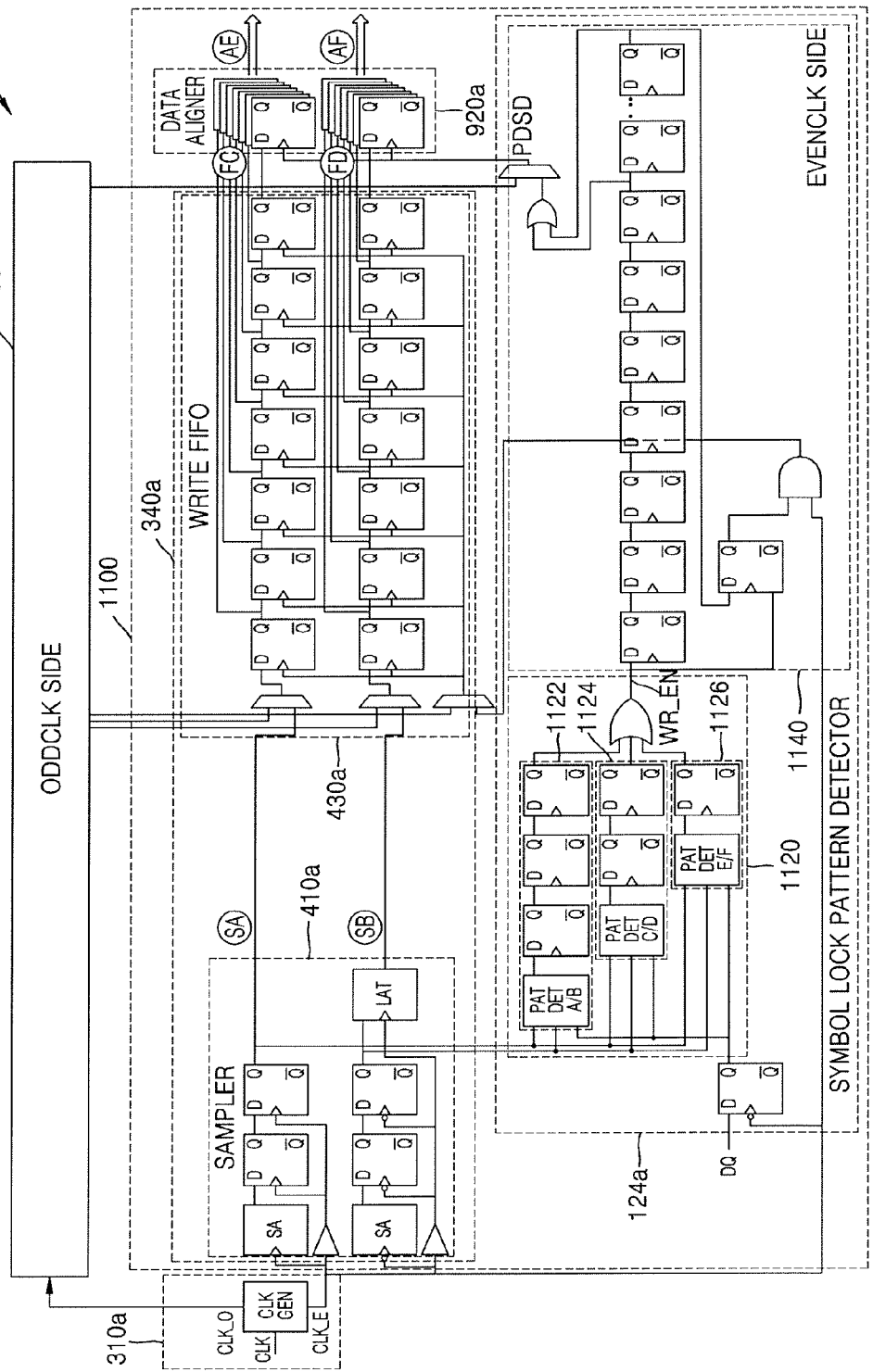
FIG. 11 is a block diagram illustrating a memory device of FIG. 1 including a symbol lock pattern detector according to an exemplary embodiment of the present inventive concept.

FIG. 11 is a block diagram illustrating a memory device 120a including a symbol lock pattern detector 124a, according to an exemplary embodiment of the present inventive concept. The memory device 120a of FIG. 11 detects a plurality of symbol lock patterns during a preamble period $T_{PREAMBLE}$ and generates a write enable signal WR_EN corresponding to the detected symbol lock patterns. In addition, the memory device 120a generates a data latch signal PDSD based on the write enable signal WR_EN. The memory device 120 of FIG. 3 generates the write enable signal WR_EN based on the write command WR, detects the symbol lock pattern during the symbol lock period $T_{SYMBOL\_LOCK}$, and generates the data latch signal PDSD based on the detected symbol lock pattern.

Referring to FIG. 11, the memory device 120a may include a clock generator 310a, a first clock side 1100, and a second clock side 1200. As in the clock generator 310 of FIG. 3, the clock generator 310a may generate a first clock signal CLK_E in synchronization with even edges, e.g., falling edges, of a clock signal CLK and a second clock signal CLK_O in synchronization with odd edges (e.g., rising edges) of the clock signal CLK. In an exemplary embodiment of the present inventive concept, the clock generator 310a may generate a first clock signal CLK_E in synchronization with even edges (e.g., falling edges) of a data strobe signal DQS and a second clock signal CLK_O in synchronization with odd edges (e.g., rising edges) of the data strobe signal DQS.

The first clock side 1100 may be a write data path configured to operate according to the first clock signal CLK_E, and the second clock side may be a write data path configured to operate according to the second clock signal CLK_O. The first clock side 1100 and the second clock side 1200 may have substantially the same configuration as each other. To avoid redundant description, only the operation of the first clock side 1100 will be described. The description about the operation of the first clock side 1100 may be applied to the second clock side 1200.

The first clock side 1100 may include a sampler and write FIFO 340a, a data aligner 920a, and the symbol lock pattern detector 124a. The sampler and write FIFO 340a may include a sampler 410a and a write FIFO 430a. Each of the sampler 410a and the write FIFO 430a may have similar configurations to each of the sampler 410 and the write FIFO 430 described above with reference to FIG. 4. The sampler 410a may receive data DQ in response to the first clock signal CLK_E, output sampler outputs SA and SB, and the write FIFO 430a may sequentially latch the sampler outputs SA and SB based on a write enable signal WR_EN, and output write FIFO outputs F-C and F-D.

The symbol lock pattern detector 124a may include a write enable signal generator 1120 and a data latch signal generator 1140. The write enable signal generator 1120 may include first to third pattern detectors 1122, 1124, and 1126, may perform a logical OR operation on the outputs of the first to third pattern detectors 1122, 1124, and 1126, and may generate the write enable signal WR_EN.

The first pattern detector 1122 may be configured to detect a symbol lock pattern A or B. The second pattern detector 1124 may be configured to detect a symbol lock pattern C or D. The third pattern detector 1126 may be configured to detect a symbol lock pattern E or F. The data latch signal generator 1140 may generate a data latch signal PDSD, which is used to control the operation of the data aligner 920a, based on the write enable signal WR_EN.

The data aligner 920a may have similar configurations to the second aligner 920 described above with reference to FIG. 9. The data aligner 920a may receive the write FIFO outputs F-C and F-D, and output data aligner outputs A-E and A-F in parallel in response to the data latch signal PDSD.

Figure 12:
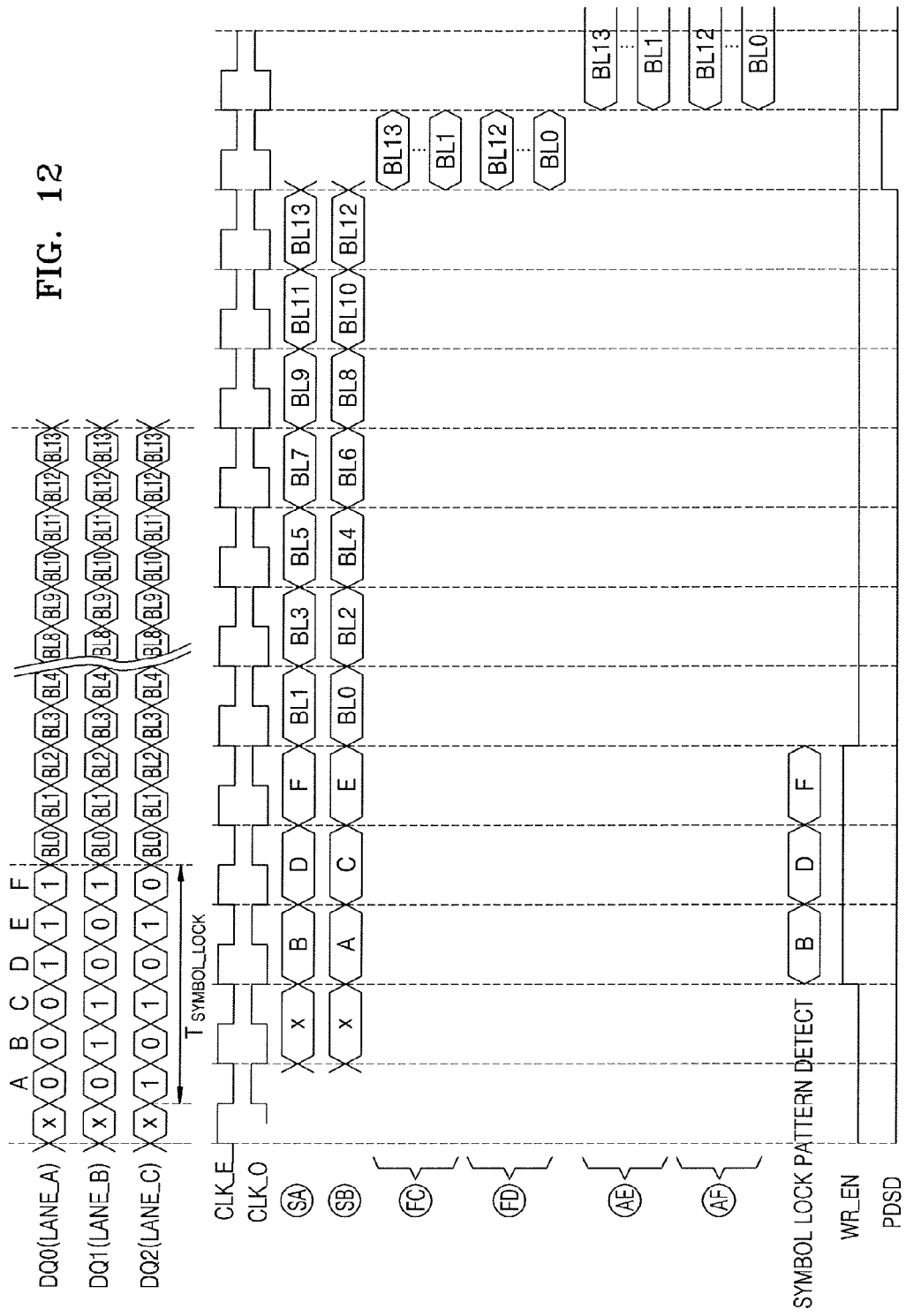
FIG. 12 is a timing diagram for describing a symbol lock method performed by the memory device of FIG. 11 according to an exemplary embodiment of the present inventive concept.

FIG. 12 is a timing diagram for describing a symbol lock method performed by the memory device 120a of FIG. 11 according to an exemplary embodiment of the present inventive concept.

Referring to FIG. 12, the first clock signal CLK_E is generated in synchronization with the even edges (e.g., falling edges) of the clock signal CLK, and the second clock signal CLK_O is generated in synchronization with the odd edges (e.g., rising edges) of the clock signal CLK. A first output SA of the sampler 410a may be "x-B-D-F-BL1-BL3-BL5-BL7-BL9-BL11-BL13" in response to the first clock signal CLK_E, and a second output SB of the sampler 410a may be "x-A-C-E-BL0-BL2-BL4-BL6-BL8-BL10-BL12" in response to the first clock signal CLK_E.

The symbol lock pattern detector 124a may detect the symbol lock pattern during the preamble period $T_{PREAMBLE}$ of the clock signal CLK. In the symbol lock pattern detector 124a, the first pattern detector 1122 detects the symbol lock pattern B, the second pattern detector 1124 detects the symbol lock pattern D, and the third pattern detector 1126 detects the symbol lock pattern F. The symbol lock pattern detector 124a generates the write enable signal WR_EN during a period of each of the detected symbol lock patterns B, D, and F. The symbol lock pattern detector 124a generates the data latch signal PDSD based on the write enable signal WR_EN and provides the data latch signal PDSD to the data aligner 920a.

The write FIFO 430a sequentially latches the outputs SA and SB of the sampler 410a based on the write enable signal WR_EN, and outputs the write FIFO outputs F-C and F-D. The data aligner 920a receives the write FIFO outputs F-C and F-D and outputs the data aligner outputs A-E and A-F in parallel in response to the data latch signal PDSD.

Figure 13:
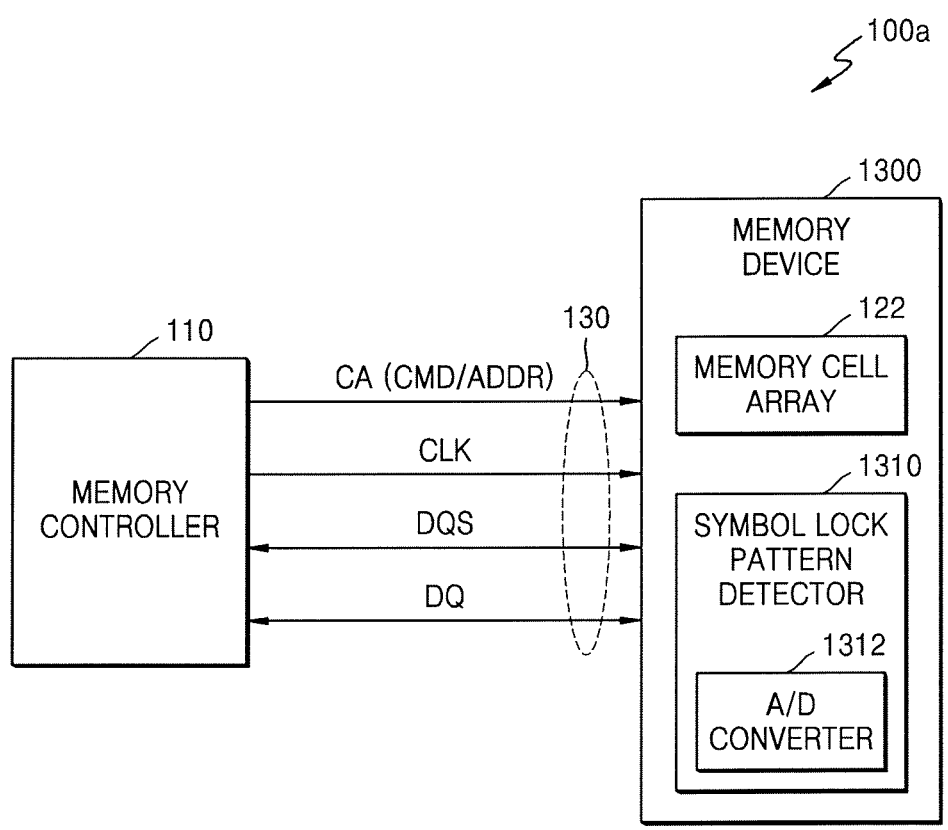
FIG. 13 is a block diagram illustrating a memory system including a memory device that performs a symbol lock method, according to an exemplary embodiment of the present inventive concept.

FIG. 13 is a block diagram illustrating a memory system 100a including a memory device 1300 that performs a symbol lock method, according to an exemplary embodiment of the present inventive concept.

Referring to FIG. 13, in the memory system 100a, a memory controller 110 is connected to the memory device 1300 via a multi-signaling I/O interface. The multi-signaling I/O interface may transmit a symbol lock pattern by applying a voltage level to at least one of a plurality of DQ data lines of a DQ bus 130. The memory device 1300 is different from the memory device 120 of FIG. 1 in that an A/D converter 1312 is included in a symbol lock pattern detector 1310.

Figure 14:
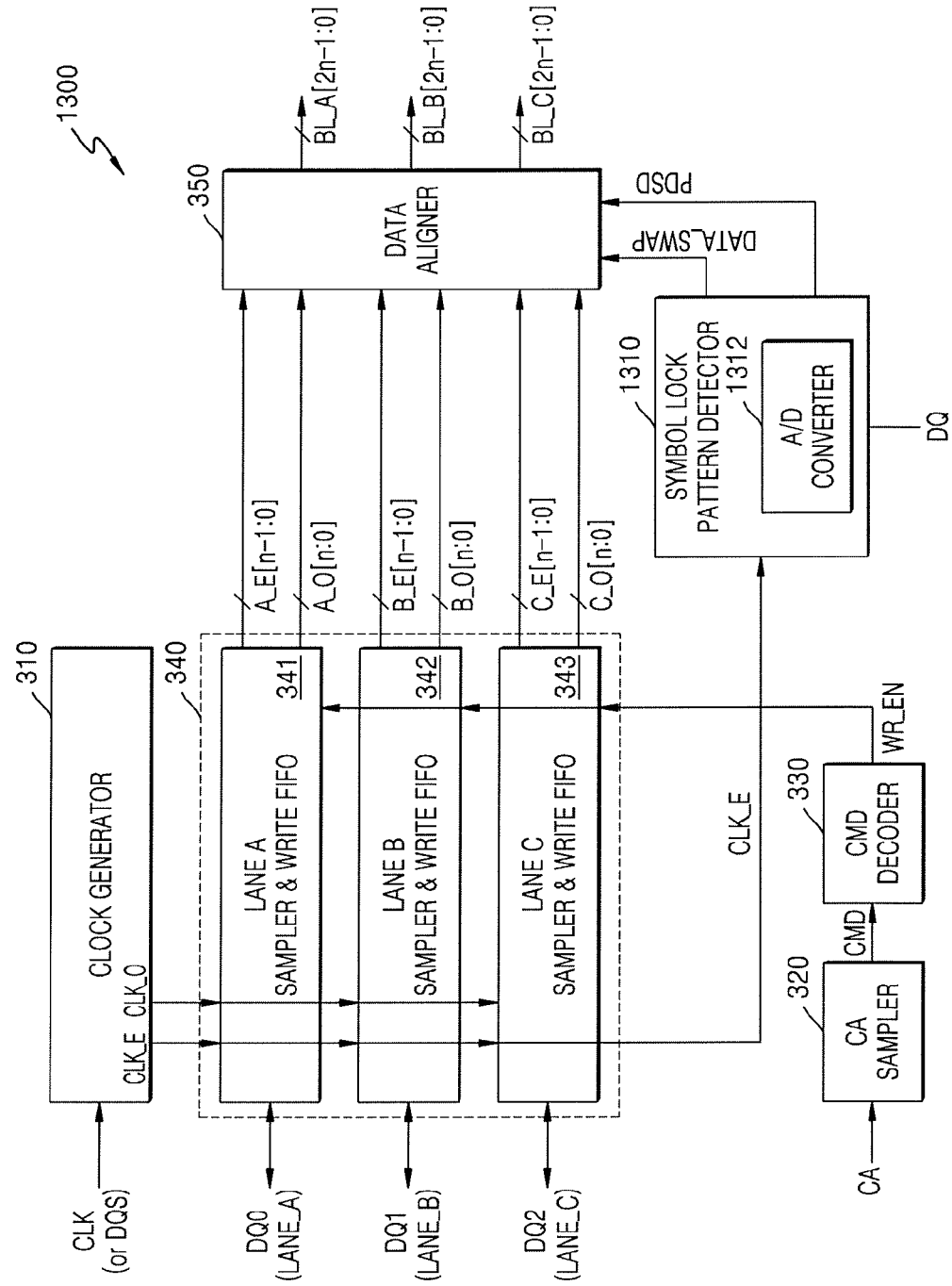
FIG. 14 is a block diagram of the memory device of FIG. 13 according to an exemplary embodiment of the present inventive concept.
Figure 15:
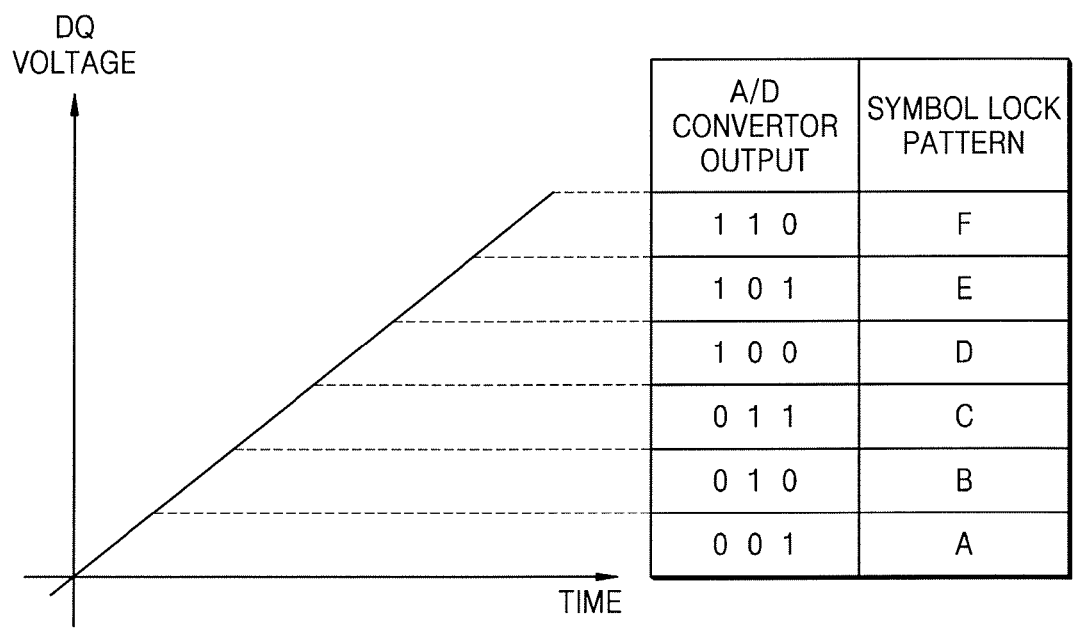
FIG. 15 is a diagram for describing an operation of a symbol lock pattern detector in the memory device of FIG. 13 according to an exemplary embodiment of the present inventive concept.

FIG. 14 is a block diagram of the memory device 1300 of FIG. 13 according to an exemplary embodiment of the present inventive concept. FIG. 15 is a diagram for describing an operation of a symbol lock pattern detector 1310 in the memory device 1300 according to an exemplary embodiment of the present inventive concept.

Referring to FIG. 14, the configuration of the memory device 1300 is similar to the configuration of the memory device 120 described above with reference to FIG. 3. The memory device 1300 may include a clock generator 310, a CA sampler 320, a command decoder 330, a sampler and write FIFO 340, a data aligner 350, and the symbol lock pattern detector 1310. All elements other than the symbol lock pattern detector 1310 of FIG. 14 may perform the same operations as the elements to which the same reference numerals are assigned in FIG. 3.

The symbol lock pattern detector 1310 may include the A/D converter 1312 connected to at least one DQ line. As illustrated in FIG. 15, the A/D converter 1312 may divide a range of a voltage level applied to the DQ line into a plurality of predetermined groups, and convert the voltage level applied to the DQ line into a digital signal corresponding to the voltage level.

In a case where the digital signal output of the A/D converter 1312 is "0-0-1", the symbol lock pattern detector 1310 may determine the digital signal output as a symbol lock pattern A. In a case where the digital output of the A/D converter 1312 is "0-1-0", the symbol lock pattern detector 1310 may determine the digital signal output as a symbol lock pattern B. In a case where the digital output of the A/D converter 1312 is "0-1-1", the symbol lock pattern detector 1310 may determine the digital signal output as a symbol lock pattern C. In a case where the digital output of the A/D converter 1312 is "1-0-0", the symbol lock pattern detector 1310 may determine the digital signal output as a symbol lock pattern D. In a case where the digital output of the A/D converter 1312 is "1-0-1", the symbol lock pattern detector 1310 may determine the digital signal output as a symbol lock pattern E. In a case where the digital output of the A/D converter 1312 is "1-1-0", the symbol lock pattern detector 1310 may determine the digital signal output as a symbol lock pattern F.

The symbol lock pattern detector 1310 may store the symbol lock patterns A to F. The symbol lock pattern detector 1310 may detect a symbol lock pattern by comparing the digital signal output of the A/D converter 1312 with each of the stored symbol lock patterns A to F.

Figure 16:
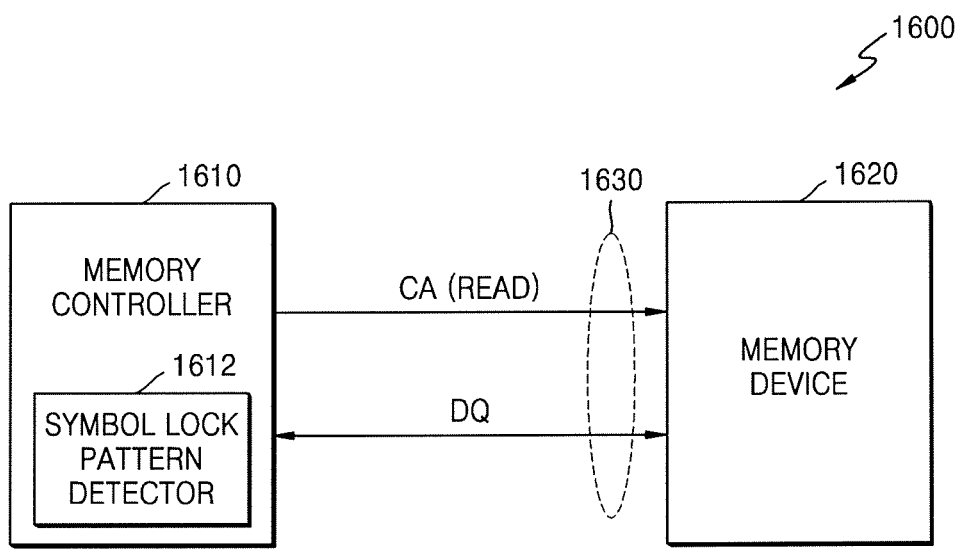
FIG. 16 is a block diagram of a memory system including a memory controller that performs a symbol lock method, according to an exemplary embodiment of the present inventive concept.
Figure 17:
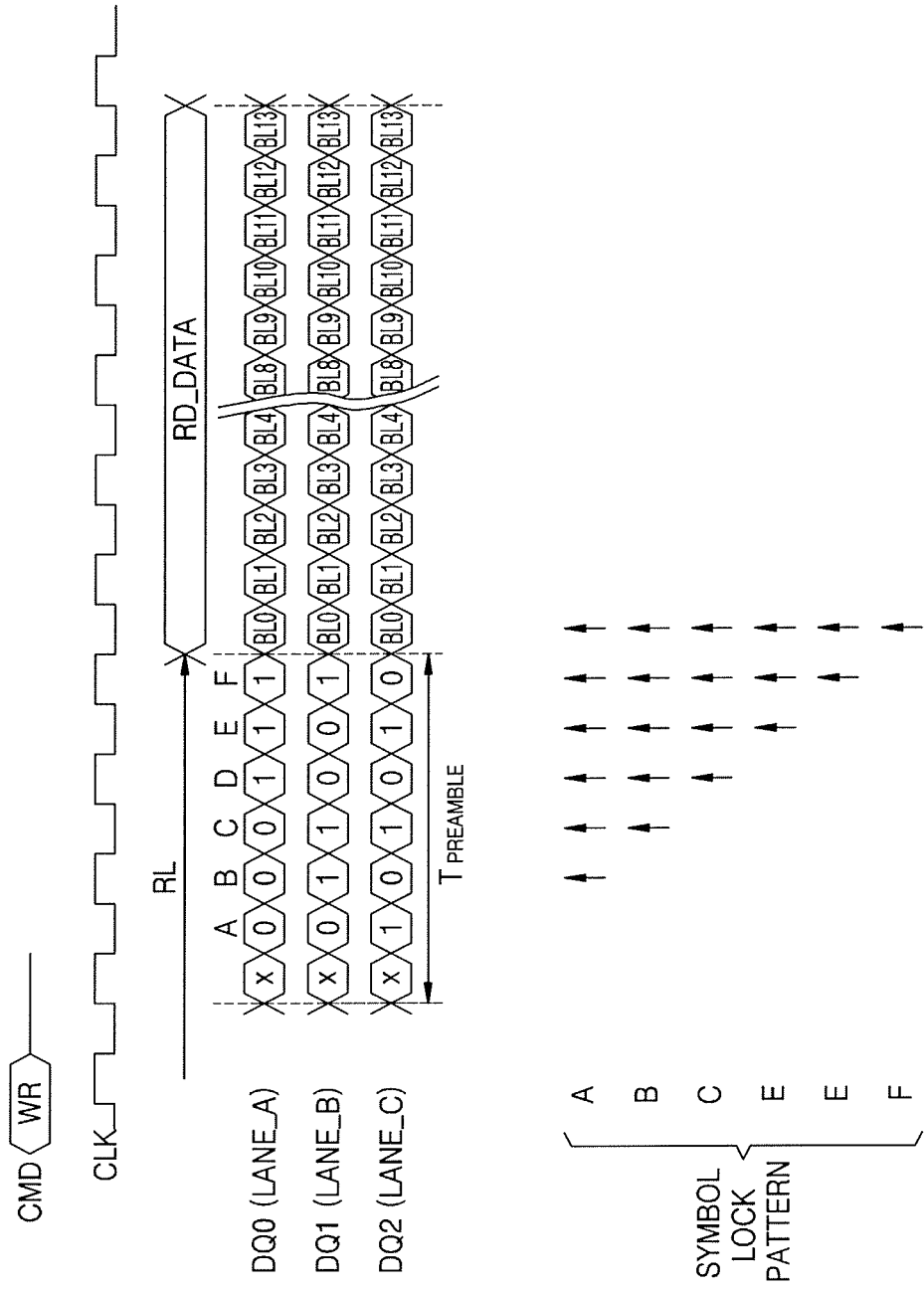
FIG. 17 is a timing diagram for describing a symbol lock operation performed by the memory controller of FIG. 16 according to an exemplary embodiment of the present inventive concept.

FIG. 16 is a block diagram of a memory system 1600 including a memory controller 1610 that performs a symbol lock method, according to an exemplary embodiment of the present inventive concept. FIG. 17 is a timing diagram for describing a symbol lock operation performed by the memory controller 1610 of FIG. 16 according to an exemplary embodiment of the present inventive concept.

Referring to FIG. 16, the memory system 1600 may include the memory controller 1610 which performs the symbol lock operation 1612, and a memory device 1620 Thus, the memory controller 1610 may generate a read command READ and transmit the read command READ to the memory device 1620 through a CA line 1630. In response to the read command READ, the memory device 1620 may read data, and transmit the read data to the memory controller 1610 through a DQ bus 1630.

The memory controller 1610 may include a symbol lock pattern detector 1612 configured to find a start point (e.g., first data) of a read data burst RD_DATA transmitted from the memory device 1620. The symbol lock pattern detector 1612 may detect a symbol lock pattern during a preamble period $T_{PREAMBLE}$ of a clock signal CLK. The symbol lock pattern detector 1612 may find a first UI (e.g., the start point) of the read data burst RD_DATA according to the detected symbol lock pattern.

Referring to FIG. 17, the memory controller 1610 may be configured to generate and transmit a read command RD synchronized with the clock signal CLK, and to receive the read data burst RD_DATA after a read latency RL from the transmission of the read command RD. The read data burst RD_DATA may be received as a plurality of DQ data through the DQ bus 1630. For example, DQ data BL0 to BL13 corresponding to a BL of 14 may be received as the read data burst RD_DATA.

The memory controller 1610 may set some DQ data (e.g., DQ0, DQ1, and DQ2) of the plurality of DQ data as a single group, and use patterns of the grouped DQ data (e.g., DQ0, DQ1, and DQ2) as symbol lock patterns. The data BL0 to BL13 corresponding to the read data burst RD_DATA may be received through multi-lanes LANE_A, LANE_B, and LANE_C. Each of the data DQ0, DQ1, and DQ2 are transferred through a corresponding one of the multi-lanes LANE_A, LANE_B, and LANE_C.

The symbol lock pattern detector 1612 of the memory controller 1610 may receive the symbol lock patterns transmitted through the multi-lanes LANE_A, LANE_B, and LANE_C during the read latency RL. The symbol lock patterns may be provided as various combinations of data bits transferred through the multi-lanes LANE_A, LANE_B, and LANE_C.

For example, in a case where the data bits transferred through the multi-lanes LANE_A, LANE_B, and LANE_C are "0-0-1", the data bits (e.g., "0-0-1") may be a symbol lock pattern A. In a case where the data bits transferred through the multi-lanes LANE_A, LANE_B, and LANE_C are "0-1-0", the data bits (e.g., "0-1-0") may be a symbol lock pattern B. In a case where the data bits transferred through the multi-lanes LANE_A, LANE_B, and LANE_C are "0-1-1", the data bits (e.g., "0-1-1") may be a symbol lock pattern C. In a case where the data bits transferred through the multi-lanes LANE_A, LANE_B, and LANE_C are "1-0-0", the data bits (e.g., "1-0-0") may be a symbol lock pattern D. In a case where the data bits transferred through the multi-lanes LANE_A, LANE_B, and LANE_C are "1-0-1", the data bits (e.g., "1-0-1") may be a symbol lock pattern E. In a case where the data bits transferred through the multi-lanes LANE_A, LANE_B, and LANE_C are "1-1-0", the data bits (e.g., "1-1-0") may be a symbol lock pattern F.

In a case where the symbol lock pattern detector 1612 detects a symbol lock pattern transferred through the multi-lanes LANE_A, LANE_B, and LANE_C as the symbol lock pattern A, data (e.g., BL0) of the multi-lanes LANE_A, LANE_B, and LANE_C, synchronized with a sixth edge of the clock signal CLK from the detection time of the symbol lock pattern A, may be determined as the first UI of the read data burst RD_DATA. In a case where the symbol lock pattern detector 1612 detects a symbol lock pattern transferred through the multi-lanes LANE_A, LANE_B, and LANE_C as the symbol lock pattern B, data (e.g., BL0) of the multi-lanes LANE_A, LANE_B, and LANE_C, synchronized with a fifth edge of the clock signal CLK from the detection time of the symbol lock pattern B, may be determined as the first UI of the read data burst RD_DATA. In a case where the symbol lock pattern detector 1612 detects a symbol lock pattern transferred through the multi-lanes LANE_A, LANE_B, and LANE_C, data (e.g., BL0) of the multi-lanes LANE_A, LANE_B, and LANE_C, synchronized with a fourth edge of the clock signal CLK from the detection time of the symbol lock pattern C, may be determined as the first UI of the read data burst WR_DATA.

In a case where the symbol lock pattern detector 1612 detects a symbol lock pattern transferred through the multi-lanes LANE_A, LANE_B, and LANE_C as the symbol lock pattern D, data (e.g., BL0) of the multi-lanes LANE_A, LANE_B, and LANE_C, synchronized with a third edge of the clock signal CLK from the detection time of the symbol lock pattern D, may be determined as the first UI of the read data burst RD_DATA. In a case where the symbol lock pattern detector 1612 detects a symbol lock pattern transferred through the multi-lanes LANE_A, LANE_B, and LANE_C as the symbol lock pattern E, data (e.g., BL0) of the multi-lanes LANE_A, LANE_B, and LANE_C, synchronized with a second edge of the clock signal CLK from the detection time of the symbol lock pattern E, may be determined as the first UI of the read data burst RD_DATA. In a case where the symbol lock pattern detector 1612 detects a symbol lock pattern transferred through the multi-lanes LANE_A, LANE_B, and LANE_C as the symbol lock pattern F, data (e.g., BL0) of the multi-lanes LANE_A, LANE_B, and LANE_C, synchronized with a first edge of the clock signal CLK from the detection time of the symbol lock pattern F, may be determined as the first UI of the read data burst RD_DATA.

According to an exemplary embodiment, the symbol lock pattern detector 1612 of the memory controller 1610 determines the first UI (e.g., BL0) of the read data burst RD_DATA according to the symbol lock patterns A to F. In an exemplary embodiment, the first UI (e.g., BL0) of the read data burst RD_DATA may be determined by using symbol lock patterns other than the symbol lock patterns A to F.

Figure 18:
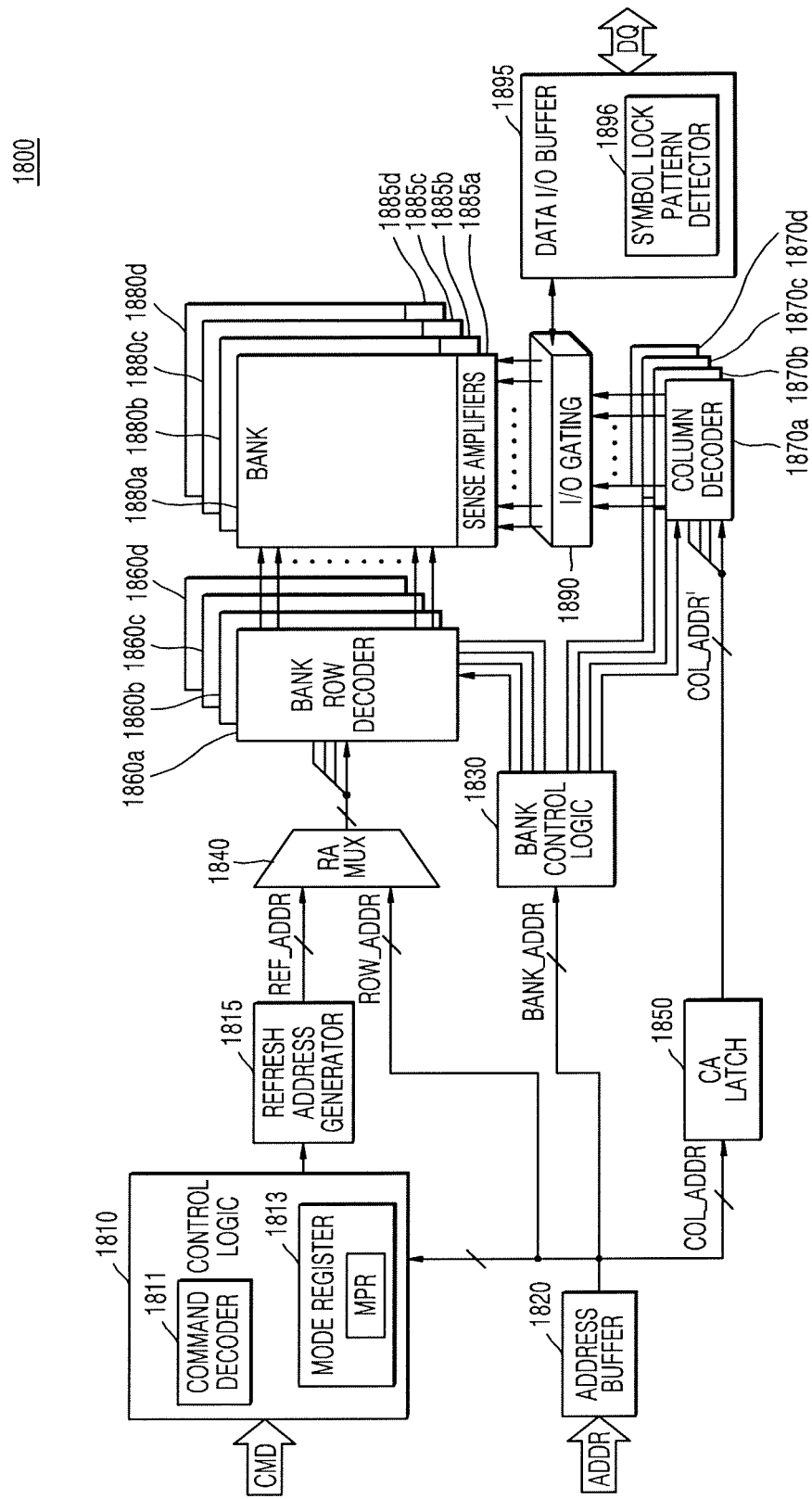
FIG. 18 is a block diagram of a memory device that performs a symbol lock method according to an exemplary embodiment of the present inventive concept.

FIG. 18 is a block diagram of a memory device 1800 that performs a symbol lock method, according to an exemplary embodiment of the present inventive concept.

Referring to FIG. 18, the memory device 1800 may include a control logic 1810, a refresh address generator 1815, an address buffer 1820, a bank control logic 1830, a row address multiplexer 1840, a column address latch 1850, a row decoder, a memory cell array, a sense amplifier, an I/O gating circuit 1890, and a data I/O buffer 1895.

The memory cell array may include first to fourth bank arrays 1880a, 1880b, 1880c, and 1880d. Each of the first to fourth bank arrays 1880a, 1880b, 1880c, and 1880d may include a plurality of memory cell rows (or pages), and a plurality of sense amplifiers 1885a, 1885b, 1885c, and 1885d. Each of the plurality of sense amplifiers 1885a, 1885b, 1885c, and 1885d is configured to sense and amplify a voltage level of each of memory cells which are respectively connected to the memory cell rows.

The row decoder may include first to fourth bank row decoders 1860a, 1860b, 1860c, and 1860d which are respectively connected to the first to fourth bank arrays 1880a, 1880b, 1880c, and 1880d. The column decoder may include first to fourth bank column decoders 1870a, 1870b, 1870c, and 1870d which are respectively connected to the first to fourth bank arrays 1880a, 1880b, 1880c, and 1880d.

For example, the memory device 180 includes first to fourth memory banks. The first memory bank includes the first bank array 1880a, the first bank row decoder 1860a, and the first bank column decoder 1870a. The second memory bank includes the second bank array 1880b, the second bank row decoder 1860b, and the second bank column decoder 1870b. The third memory bank includes the third bank array 1880c, the third bank row decoder 1860c, and the third bank column decoder 1870c. The fourth memory bank includes the fourth bank array 1880d, the fourth bank row decoder 1860d, and the fourth bank column decoder 1870d. While the memory device 1800 includes the four memory banks is illustrated in FIG. 11 as an example, but the memory device 1800 may include an arbitrary number of memory banks.

In addition, in an exemplary embodiment, the memory device 1800 may be dynamic random access memory (DRAM) such as double data rate synchronous dynamic random access memory (DDR SDRAM), low power double data rate (LPDDR) SDRAM, graphics double data rate (GDDR) SDRAM, rambus dynamic random access memory (RDRAM), or the like.

The control logic 1810 may control the operation of the memory device 1800. For example, the control logic 1810 may generate control signals for the memory device 1800 to perform a write operation or a read operation. The control logic 1810 may include a command decoder 1811 and a mode register 1813. The command decoder 1811 may be configured to decode a command CMD received from a memory controller, and the mode register 1813 may be configured to set an operation mode of the memory device 1800.

The command decoder 1811 may decode a write enable signal /WE, a row address strobe signal /RAS, a column address strobe signal /CAS, and a chip select signal /CS, and generate control signals corresponding to the command CMD. The command CMD may include an active command, a read command, a write command, and a precharge command.

The mode register 1813 may provide a plurality of operation options in the memory device 1800, and program various functions, features, and modes of the memory device 1800.

The control logic 1810 may further receive differential clocks CLK_t/CLK_c and a clock enable signal CKE for driving the memory device 1800 in a synchronous manner. Thus, data of the memory device 1800 may be processed (e.g., output) at a double data rate. The clock enable signal CKE may be captured at a rising edge of the clock CLK_t.

The control logic 1810 may control the refresh address generator 1815 to perform an auto-refresh operation in response to a refresh command, or may control the refresh address generator 1815 to perform a self-refresh operation in response to a self-refresh entry command.

The refresh address generator 1815 may generate a refresh address REF_ADDR corresponding to a memory cell row on which the refresh operation is to be performed. The refresh address generator 1815 may generate the refresh address REF_ADDR at a refresh period which is defined in the standard of a volatile memory device.

The address buffer 1820 may receive an address ADDR from the memory controller, and the address ADDR may include a bank address BANK_ADDR, a row address ROW_ ADDR, and a column address COL_ADDR. In addition, the address buffer 1820 may provide the received bank address BANK_ADDR to the bank control logic 1830, provide the received row address ROW_ADDR to the row address multiplexer 1840, and provide the received column address COL_ADDR to the column address latch 1850.

The bank control logic 1830 may generate bank control signals in response to the bank address BANK_ADDR. The bank row decoder corresponding to the bank address BANK_ADDR among the first to fourth bank row decoders 1860a, 1860b, 1860c, and 1860d may be activated in response to the bank control signals. In addition, the bank column decoder corresponding to the bank address BANK_ADDR among the first to fourth bank column decoders 1870a, 1870b, 1870c, and 1870d may be activated in response to the bank control signals.

The bank control logic 1830 may generate bank group control signals in response to the bank address BANK_ADDR which determines (e.g., selects) a bank group. Bank row decoders of the bank group selected according to the bank address BANK_ADDR among the first to fourth bank row decoders 1860a, 1860b, 1860c, and 1860d may be activated in response to the bank group control signals. Column decoders the bank group selected according to the bank address BANK_ADDR among the first to fourth bank column decoders 1870a, 1870b, 1870c, and 1870d may be activated in response to the bank group control signals.

The row address multiplexer 1840 may receive the row address ROW_ADDR from the address buffer 1820, and receive the refresh row address REF_ADDR from the refresh address generator 1815. The row address multiplexer 1840 may selectively output the row address ROW_ADDR or the refresh row address REF_ADDR. The row addresses, which are output from the row address multiplexer 1840, may be applied to the first to fourth bank row decoders 1860a, 1860b, 1860c, and 1860d.

The bank row decoder, which is activated by the bank control logic 1830 among the first to fourth bank row decoders 1860a, 1860b, 1860c, and 1860d, may decode the row address ROW_ADDR output from the row address multiplexer 1840 and may activate a word line corresponding to the decoded row address ROW_ADDR. For example, the activated bank row decoder may apply a word line driving voltage to the word line corresponding to the decoded row address ROW_ADDR.

The column address latch 1850 may receive the column address COL_ADDR from the address buffer 1820 and temporarily store the received column address COL_ADDR therein. The column address latch 1850 may gradually increase the received column address COL_ADDR in a burst mode. The column address latch 1850 may apply the temporarily stored column address COL_ADDR or the gradually increased column address COL_ADDR to each of the first to fourth bank column decoders 1870a, 1870b, 1870c, and 1870d.

The bank column decoder, which is activated by the bank control logic 1830 among the first to fourth bank column decoders 1870a, 1870b, 1870c, and 1870d, may activate a sense amplifier corresponding to the bank address BANK_ADDR and the column address COL_ADDR through the I/O gating circuit 1890.

The I/O gating circuit 1890 may include circuits configured to gate I/O data, an input data mask logic, read data latches configured to store data output from the first to fourth bank arrays 1880a, 1880b, 1880c, and 1880d, and a write driver configured to write data to the first to fourth bank arrays 1880a, 1880b, 1880c, and 1880d.

The memory controller may provide write data to be written to a memory cell array of one of the first to fourth bank arrays 1880a, 1880b, 1880c, and 1880d to the data I/O buffer 1895 through the memory buffer. The write data, which is provided from the memory controller to the data I/O buffer 1895, may be written to one bank array through the write driver.

The data I/O buffer 1895 may include a symbol lock pattern detector 1896 configured to find a start point of a write data burst. The symbol lock pattern detector 1896 may store a plurality of symbol lock patterns, compare received DQ data with each of the stored symbol lock patterns, and detect a symbol lock pattern which is matched to the received DQ data among the stored symbol lock patterns. The symbol lock pattern detector 1896 may find first data of the write data burst according to the detected symbol lock pattern.

Figure 19:
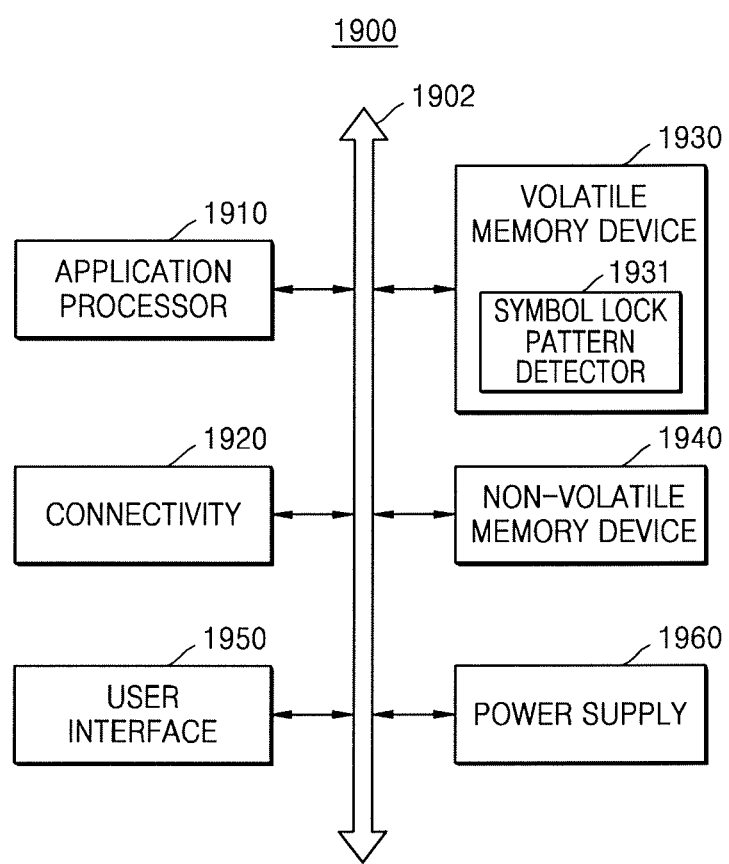
FIG. 19 is a block diagram of a mobile system including a memory device that performs a symbol lock method according to an exemplary embodiment of the present inventive concept.

FIG. 19 is a block diagram of a mobile system 1900 including a memory device that performs a symbol lock method, according to an exemplary embodiment of the present inventive concept.

Referring to FIG. 19, the mobile system 1900 may include an application processor 1910, a connectivity device 1920, a first memory device 1930, a second memory device 1940, a user interface 1950, and a power supply 1960. In an exemplary embodiment, the first memory device 1930 may be a volatile memory device, and the second memory device 1940 may be a non-volatile memory device. In an exemplary embodiment, the mobile system 1900 may be any type of mobile systems, such as a mobile phone, a smart phone, a personal digital assistant (PDA), a portable multimedia player (PMP), a digital camera, a music player, a portable game console, a navigation system, or the like.

The application processor 1910 may execute an internet browser, a game, a video, or the like. In an exemplary embodiment, the application processor 1910 may include one or more cores. For example, the application processor 1910 may include a dual-core, a quad-core, a hexa-core, or the like. In addition, in an exemplary embodiment, the application processor 1910 may further include an internal or external cache memory.

The connectivity device 1920 may perform wireless communication or wired communication with an external device. For example, the connectivity device 1920 may perform communication with an external device through at least one of Ethernet, near field communication (NFC), radio frequency identification (RFID), mobile telecommunication, memory card, universal serial bus (USB), or the like. For example, the connectivity device 1920 may include a baseband chipset and support global system for mobile communications (GSM), general packet radio service (GPRS), wideband code division multiple access (WCDMA), high-speed packet access (HSxPA), or the like.

The first memory device 1930 (e.g., a volatile memory device) may store data processed by the application processor 1910 as write data or may operate as a working memory. The first memory device 1930 may include a symbol lock pattern detector 1931 configured to find a start point (e.g., first data) of a write data burst received by the first memory device 1930. The symbol lock pattern detector 1931 may store a plurality of symbol lock patterns, compare received data (e.g., data corresponding to a symbol lock pattern) with each of the stored symbol lock patterns, and detect a symbol lock pattern which is matched to the received data among the stored symbol lock patterns. The symbol lock pattern detector 1931 may find first data of the write data burst according to the detected symbol lock pattern.

The second memory device 1940 (e.g., a non-volatile memory device) may store a boot image for booting the mobile system 1900. Examples of the second memory device 1940 may include electrically erasable programmable read-only memory (EEPROM), a flash memory, phase-change random access memory (PRAM), resistance random access memory (RRAM), nano floating gate memory (NFGM), polymer random access memory (PoRAM), magnetic random access memory (MRAM), ferroelectric random access memory (FRAM), or memories similar thereto.

The user interface 1950 may include one or more input devices such as a keypad, a touch screen, a mouse, or the like. The user interface 1950 may include one or more output devices such as a speaker, a display device, or the like. The power supply 1960 may supply an operating voltage. In addition, in an exemplary embodiment, the mobile system 1900 may further include a camera image processor (CIP), and may further include a storage device such as a memory card, a solid state drive (SSD), a hard disk drive (HDD), a CD-ROM, or the like.

Figure 20:
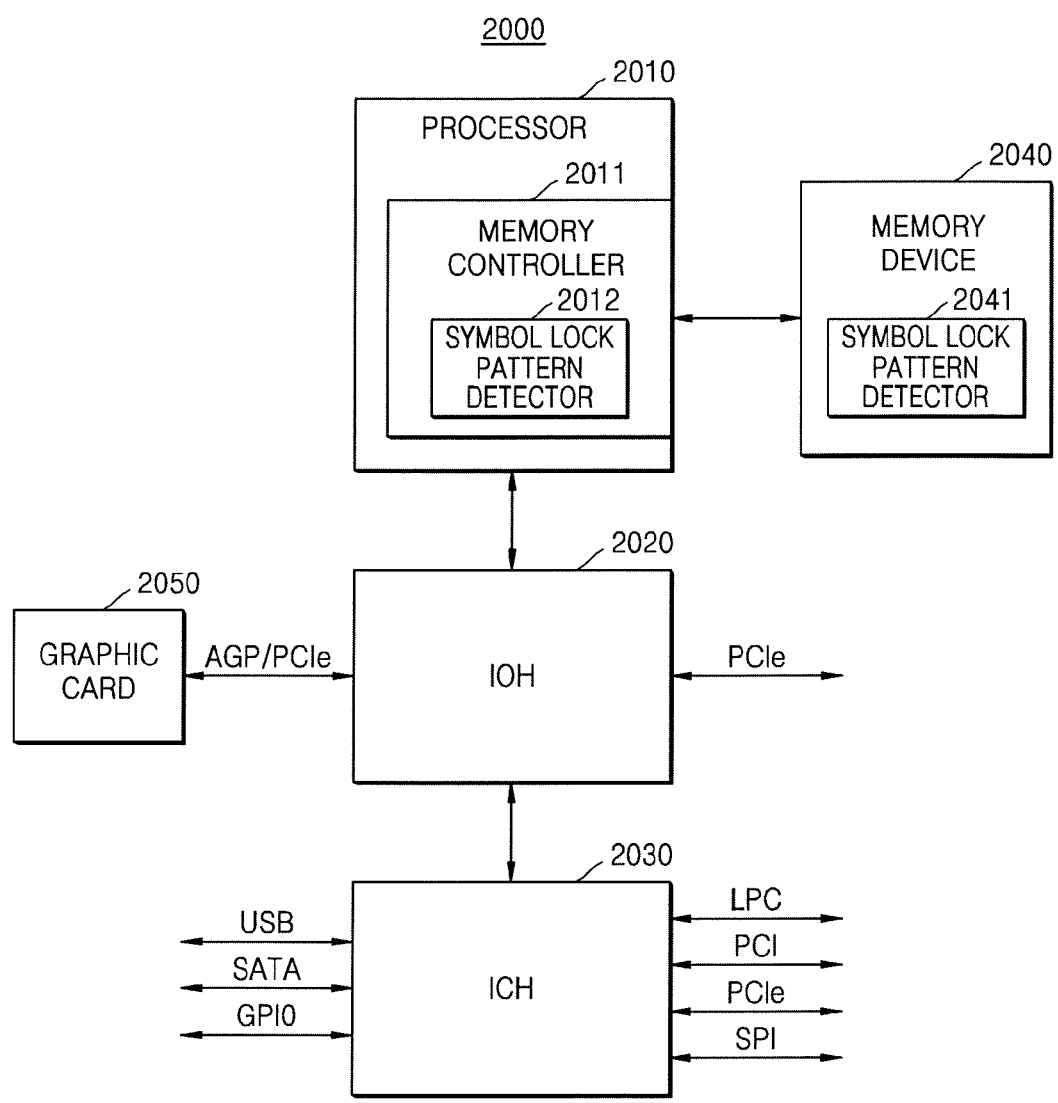
FIG. 20 is a block diagram of a computing system including a memory device that performs a symbol lock method, according to an exemplary embodiment of the present inventive concept.

FIG. 20 is a block diagram of a computing system 2000 including a memory device 2040 that performs a symbol lock method, according to an exemplary embodiment of the present inventive concept.

Referring to FIG. 20, the computing system 2000 may include a processor 2010, an I/O hub 2020, an I/O controller hub 2030, the memory device 2040, and a graphic card 2050. In an exemplary embodiment, the computing system 2000 may be any type of computing system, such as a personal computer (PC), a server computer, a workstation, a laptop computer, a mobile phone, a smart phone, a personal digital assistant (PDA), a portable multimedia player (PMP), a digital camera, a digital television, a set-top box, a music player, a portable game console, a navigation system, or the like.

The processor 2010 may execute various computing functions such as specific calculations, tasks, or the like. For example, the processor 2010 may be a microprocessor or a central processing unit (CPU). In an exemplary embodiment, the processor 2010 may include one or more cores. For example, the processor 2010 may include a dual-core, a quad-core, a hexa-core, or the like. In addition, the computing system 2000 is illustrated in FIG. 13 as including a single processor 2010, but, in an exemplary embodiment, the computing system 2000 may include a plurality of processors. In addition, in an exemplary embodiment, the processor 2010 may further include an internal or external cache memory.

The processor 2010 may include a memory controller 2011 configured to control the operation of the memory device 2040. The memory controller 2011 included in the processor 2010 may be referred to as an integrated memory controller (IMC). In an exemplary embodiment, the memory controller 2011 may be disposed inside the I/O hub 2020. The I/O hub 2020 including the memory controller 2011 may be referred to as a memory controller hub (MCH).

The memory controller 2011 may include a symbol lock pattern detector 2012 configured to find a start point (e.g., first data) of a read data burst provided from the memory device 2040. The symbol lock pattern detector 2012 may store a plurality of symbol lock patterns, compare data (e.g., data corresponding to a symbol lock pattern) received by the memory controller 2011 with each of the stored symbol lock patterns, and detect a symbol lock pattern which is matched to the received data among the stored symbol lock patterns. The symbol lock pattern detector 2012 may find first data of the read data burst according to the detected symbol lock pattern.

In an exemplary embodiment of the present inventive concept, the memory device 2040 may include a symbol lock pattern detector 2041 configured to find a start point (e.g., first data) of a write data burst provided from the memory controller 2011. The symbol lock pattern detector 2041 may store a plurality of symbol lock patterns, compare data (e.g., data corresponding to a symbol lock pattern) received by the memory device 2040 with each of the stored symbol lock patterns, and detect a symbol lock pattern which is matched to the received data among the stored symbol lock patterns. The symbol lock pattern detector 2041 may find first data of the write data burst according to the detected symbol lock pattern.

The I/O hub 2020 may manage data transmission between the processor 2010 and devices such as the graphic card 2050, or the like. The I/O hub 2020 may be connected to the processor 2010 via various types of interfaces. For example, the I/O hub 202 and the processor 2010 may be connected to each other via various interface standards, such as front side bus (FSB), system bus, HyperTransport, lighting data transport (LDT), QuickPath Interconnect (QPI), common system interface (CSI), peripheral component interface-express (PCIe), or the like. The computing system 2000 is illustrated in FIG. 20 as including a single I/O hub 2020, but the computing system 2000 may include a plurality of I/O hubs.

The I/O hub 2020 may provide various interfaces for devices. For example, the I/O hub 2020 may provide an accelerated graphics port (AGP) interface, a peripheral component interface-express (PCIe), a communications streaming architecture (CSA) interface, and/or the like.

The graphic card 2050 may be connected to the I/O hub 2020 via the AGP interface or the PCIe. The graphic card 2050 may control a display device to display an image. The graphic card 2050 may include an internal semiconductor memory device and an internal processor configured to process image data. In an exemplary embodiment, the graphic card 2050 may be disposed outside the I/O hub 2020. In an exemplary embodiment, a graphic device may be included in the I/O hub 2020. In this case, the graphic device included in the I/O hub 2020 may be referred to as integrated graphics. In addition, the I/O hub 2020 including the memory controller and the graphic device may be referred to as a graphics and memory controller hub (GMCH).

The I/O controller hub 2030 may perform data buffering and interfacing such that various system interfaces are efficiently operated. The I/O controller hub 2030 may be connected to the I/O hub 2020 via an internal bus. For example, the I/O hub 2020 and the I/O controller hub 2030 may be connected to each other via a direct media interface (DMI), a hub interface, an enterprise southbridge interface (ESI), PCIe, or the like.

The I/O controller hub 2030 may provide various interfaces for peripheral devices. For example, the I/O controller hub 2030 may provide a universal serial bus (USB) port, a serial advanced technology attachment (SATA) port, a general purpose input/output (GPIO) port, a low pin count (LPC) bus, a serial peripheral interface (SPI), PCI, PCIe, or the like.

In an exemplary embodiment, two or more of the processor 2010, the I/O hub 2020, and the I/O controller hub 2030 may be implemented with a single chipset.

While the present inventive concept has been particularly shown and described with reference to exemplary embodiments thereof, it will be understood that various changes in form and details may be made therein without departing from the spirit and scope of the following claims.

What is claimed is:

1. A memory system comprising:
   a transmitter configured to transmit a data signal corresponding to a first symbol lock pattern and a data burst via an interface, the data burst having a first data and a subsequent data; and
   a receiver configured to receive the data signal, detect the first symbol lock pattern based on the received data signal, and find the first data of the data burst according to the detected first symbol lock pattern,
   wherein a portion of the receiver is configured to serially output the data signal and the data burst in response to first and second clock signals and a write enable signal.

2. The memory system of claim 1, wherein the receiver stores a plurality of second symbol lock patterns, compares each of the stored second symbol lock patterns with the received data signal, determines the received data signal to be matched with at least one of the stored second symbol lock patterns, and detects the first symbol lock pattern.

3. The memory system of claim 2, wherein the transmitter comprises a memory controller configured to output a write command, and wherein the receiver comprises a memory device configured to generate the write enable signal in response to the write command, and find the first data of the data burst based on the write enable signal.

4. The memory system of claim 1, wherein the receiver stores a plurality of second symbol lock patterns, compares each of the stored second symbol lock patterns with the received data signal, determines the received data signal to be matched with at least one of the stored second symbol lock patterns, detects the first symbol lock pattern, generates the write enable signal according to the detected first symbol lock pattern, and finds the first data of the data burst based on the write enable signal.

5. The memory system of claim 1, wherein the transmitter comprises a memory device configured to read data and transmit the read data as the data burst in response to a read command, and
   wherein the receiver comprises a memory controller configured to output the read command and finding the first data of the read data.

6. The memory system of claim 5, wherein the memory controller stores a plurality of second symbol lock patterns, and detects the first symbol lock pattern by comparing each of the stored second symbol lock patterns with the received data signal.

7. The memory system of claim 1, wherein the data signal corresponding to the first symbol lock pattern is generated using a bit pattern transferred through some of a plurality of data lines disposed between the transmitter and the receiver.

8. The memory system of claim 1, wherein the data signal corresponding to the first symbol lock pattern is generated using a first voltage level applied to a first data line of a plurality of data lines disposed between the transmitter and the receiver.

9. The memory system of claim 1, wherein the first and second clock signals are inverse with respect to each other.

10. A memory device comprising:
    a command decoder configured to generate a write enable signal in response to a write command;
    a sampler and write first-input first-output (FIFO) configured to receive and output a write data burst and a data signal corresponding to a first symbol lock pattern according to a clock signal, the write data burst having a first data and a subsequent data;

a symbol lock pattern detector configured to find the first data of the write data burst based on the write enable signal; and a clock generator configured to receive the clock signal, generate a first clock signal in synchronization with one of a rising edge or a falling edge of the clock signal, and generate a second clock signal in synchronization with another one of the rising edge or the falling edge of the clock signal, wherein the sampler and write FIFO serially outputs the write data burst and the data signal according to the first and second clock signals.

11. The memory device of claim 10, wherein the symbol lock pattern detector stores a plurality of second symbol lock patterns, detects the first symbol lock pattern by comparing the data signal output from the sampler and write FIFO with each of the stored second symbol lock patterns in response to the write enable signal, and generates a data latch signal according to the detected first symbol lock pattern.

12. A memory device comprising:
a sampler and write first-in first out (FIFO) configured to receive and output a data signal corresponding to a first symbol lock pattern and a write data burst according to a clock signal, the write data burst having a first data and a subsequent data;

a symbol lock pattern detector configured to store a plurality of second symbol lock patterns, detect the first symbol lock pattern by comparing an output of the sampler and write FIFO with each of the stored second symbol lock patterns, generate a write enable signal according to the detected first symbol lock pattern, and find the first data of the write data burst according to the write enable signal; and a clock generator configured to receive the clock signal, generate a first clock signal in synchronization with one of a rising edge or a falling edge of the clock signal, and generate a second clock signal in synchronization with another one of the rising edge or the falling edge of the clock signal, wherein the sampler and write FIFO serially outputs the write data burst and the data signal according to the first and second clock signals.

13. The memory device of claim 12, wherein the symbol lock pattern detector generates a data latch signal based on the write enable signal.

14. The memory device of claim 13, further comprising a data aligner configured to output the write data burst in parallel in response to the data latch signal.

15. A memory system comprising:
a memory controller configured to transmit a write command, a data signal corresponding to a first symbol lock pattern, and a data burst having a first data and a subsequent data; and a memory device configured to receive the write command, the data signal, and the data burst, generate a write enable signal in response to the write command, detect the first symbol lock pattern in response to the write enable signal, and find the first data of the data burst based on the detected first symbol lock pattern, wherein the memory device is further configured to output the data signal and the data burst in response to first and second clock signals and the write enable signal.

16. The memory system of claim 15, wherein the memory device comprises:
a clock generator configured to receive a clock signal, generate the first clock signal in synchronization with one of a rising edge or a falling edge of the clock signal, and generate the second clock signal in synchronization with another one of the rising edge or the falling edge of the clock signal;

a sampler and write first-in first out (FIFO) configured to receive and output the data signal and the data burst in response to the first and second clock signals and the write enable signal; and a symbol lock pattern detector configured to detect the first symbol lock pattern based on an output of the sampler and write FIFO in response to the write enable signal.

17. The memory system of claim 15, wherein the memory device includes:
a storage unit storing a plurality of second symbol lock patterns; and a comparator comparing the received data signal with each of the second symbol lock patterns stored in the storage unit, determining the data signal to be matched with at least one of the second symbol lock patterns, and detecting the first symbol lock pattern.

18. The memory system of claim 16, wherein the symbol lock pattern detector generates a data latch signal based on the detected first symbol lock pattern.

19. The memory system of claim 18, wherein the memory device includes a data aligner configured to output the data burst in parallel in response to the data latch signal.

* * * * *